(12) United States Patent
Shaw et al.

(10) Patent No.: US 8,234,163 B2
(45) Date of Patent: **\*Jul. 31, 2012**

(54) SYSTEM AND METHOD FOR PROVIDING A DISCOUNT

(76) Inventors: David Shaw, Boca Raton, FL (US); John Lavin, Barrington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,517

(22) Filed: Jul. 22, 2011

(65) Prior Publication Data

US 2011/0276379 A1 Nov. 10, 2011

Related U.S. Application Data

(63) Continuation of application No. 12/044,535, filed on Mar. 7, 2008, now Pat. No. 8,005,714, which is a continuation-in-part of application No. 11/049,608, filed on Feb. 2, 2005, now Pat. No. 7,925,533.

(60) Provisional application No. 60/541,220, filed on Feb. 2, 2004, provisional application No. 60/894,059, filed on Mar. 9, 2007.

(51) Int. Cl.
*G06Q 30/00* (2012.01)

(52) U.S. Cl. .................................. 705/14.17
(58) Field of Classification Search ............... 705/14.17
See application file for complete search history.

(56) References Cited

U.S. PATENT DOCUMENTS

| | | | |
|---|---|---|---|
| 5,380,991 A | 1/1995 | Valencia | |
| 5,592,376 A | 1/1997 | Hodroff | |
| 5,923,016 A | 7/1999 | Fredregill et al. | |
| 6,226,621 B1 | 5/2001 | Warsh | |
| 6,332,128 B1 | 12/2001 | Nicholson | |
| 6,584,448 B1 | 6/2003 | Laor | |
| 7,236,944 B1* | 6/2007 | Schwartz et al. | 705/14.36 |
| 7,925,533 B2 | 4/2011 | Shaw et al. | |
| 8,005,714 B2* | 8/2011 | Shaw et al. | 705/14.17 |
| 2001/0037241 A1* | 11/2001 | Puri | 705/14 |
| 2001/0037243 A1 | 11/2001 | Rouston et al. | |
| 2001/0054003 A1* | 12/2001 | Chien et al. | 705/14 |
| 2002/0019772 A1 | 2/2002 | Hillier et al. | |
| 2002/0040319 A1 | 4/2002 | Brauer | |
| 2002/0059103 A1 | 5/2002 | Anderson et al. | |
| 2002/0065723 A1* | 5/2002 | Anderson et al. | 705/14 |
| 2002/0107731 A1 | 8/2002 | Teng | |

(Continued)

OTHER PUBLICATIONS

Young, Margaret L., "Trends: Loyalty Programs; Card Tricks," CIO Insight, New York, vol. 1, Iss. 34, Dec. 1, 2003, p. 51.*

(Continued)

*Primary Examiner* — Nathan Erb
(74) *Attorney, Agent, or Firm* — Gifford, Krass, Sprinkle, Anderson & Citkowski, P.C.; Douglas L. Wathen

(57) ABSTRACT

Inventive systems and methods offer a high-perceived savings value to an end-user while maintaining the perception of product value. Further, systems and methods for providing a discount are described which impose little or no cost on the service or product provider. An embodiment of an inventive method includes presenting a display of a price paid by a consumer without access to the virtual currency along with a display of an amount payable by the end-user in actual currency in combination with virtual currency. The end-user perceives a benefit to using the virtual currency since the price paid in actual currency is less than the displayed price to be paid by a consumer without access to the virtual currency.

14 Claims, 18 Drawing Sheets

U.S. PATENT DOCUMENTS

| | | | |
|---|---|---|---|
| 2002/0143614 A1 | 10/2002 | MacLean et al. | |
| 2002/0143621 A1 | 10/2002 | Donnelly et al. | |
| 2002/0169661 A1 | 11/2002 | Demsky et al. | |
| 2002/0188511 A1 | 12/2002 | Johnson et al. | |
| 2003/0036952 A1 | 2/2003 | Panttaja et al. | |
| 2003/0037965 A1* | 2/2003 | Bennard | 177/4 |
| 2003/0040964 A1 | 2/2003 | Lacek | |
| 2003/0041025 A1 | 2/2003 | Bonalle et al. | |
| 2003/0050831 A1 | 3/2003 | Klayh | |
| 2003/0055782 A1 | 3/2003 | Slater | |
| 2003/0061099 A1 | 3/2003 | Watanabe | |
| 2003/0069787 A1 | 4/2003 | Tendon et al. | |
| 2003/0083949 A1* | 5/2003 | Kar | 705/26 |
| 2003/0093319 A1 | 5/2003 | Jarman | |
| 2003/0097298 A1 | 5/2003 | Klimpl et al. | |
| 2003/0115124 A1 | 6/2003 | Gonzalez | |
| 2003/0130890 A1 | 7/2003 | Banerjee et al. | |
| 2003/0130895 A1 | 7/2003 | Antonucci et al. | |
| 2003/0149625 A1 | 8/2003 | Leonardi et al. | |
| 2003/0167205 A1 | 9/2003 | Maruyama et al. | |
| 2003/0200142 A1 | 10/2003 | Hicks et al. | |
| 2003/0212595 A1 | 11/2003 | Antonucci | |
| 2003/0216964 A1 | 11/2003 | MacLean et al. | |
| 2003/0225618 A1 | 12/2003 | Hessburg et al. | |
| 2003/0233278 A1 | 12/2003 | Marshall | |
| 2004/0006510 A1 | 1/2004 | Lertzman et al. | |
| 2004/0024642 A1 | 2/2004 | Sidlo et al. | |
| 2004/0034563 A1 | 2/2004 | Brissette | |
| 2004/0039633 A1 | 2/2004 | Nicholson | |
| 2004/0049421 A1 | 3/2004 | Hagiwara | |
| 2004/0064371 A1 | 4/2004 | Crapo | |
| 2004/0098306 A1 | 5/2004 | Fitzpatrick et al. | |
| 2004/0122734 A1 | 6/2004 | Schleicher et al. | |
| 2004/0122736 A1* | 6/2004 | Strock et al. | 705/14 |
| 2004/0128193 A1 | 7/2004 | Brice et al. | |
| 2004/0143491 A1 | 7/2004 | Steinberg | |
| 2004/0158491 A1 | 8/2004 | Ishii | |
| 2004/0186774 A1 | 9/2004 | Lee | |
| 2004/0193489 A1 | 9/2004 | Boyd et al. | |
| 2004/0199421 A1 | 10/2004 | Oda et al. | |
| 2004/0199422 A1 | 10/2004 | Napier et al. | |
| 2004/0199441 A1* | 10/2004 | Mayfield | 705/35 |
| 2004/0204995 A1 | 10/2004 | Weng et al. | |
| 2004/0230481 A1 | 11/2004 | Bushold et al. | |
| 2004/0243467 A1 | 12/2004 | Ewell et al. | |
| 2004/0260652 A1* | 12/2004 | Rose | 705/51 |
| 2005/0086103 A1* | 4/2005 | Agura et al. | 705/14 |
| 2005/0109840 A1* | 5/2005 | Walker et al. | 235/380 |
| 2006/0010033 A1 | 1/2006 | Thomas | |

OTHER PUBLICATIONS

Young, M., Trends: Loyalty Programs; Card Tricks, CIO Insight, New York, 1(34): 51, Dec. 1, 2003.

* cited by examiner

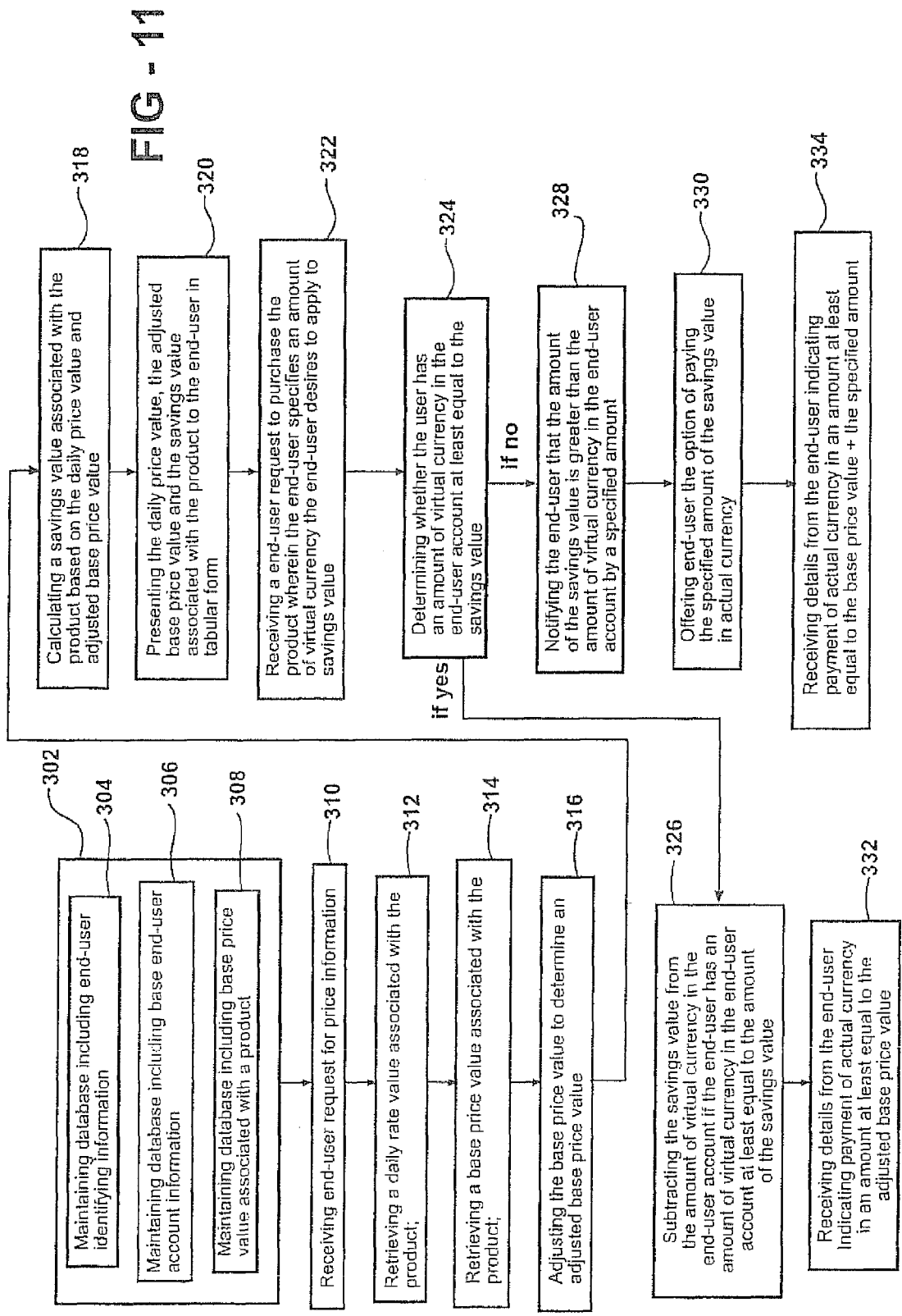

400 →

| Daily Price Value | $200 |
|---|---|
| Savings Value | $75 |
| Adjusted Base Price Value | $125 |

| Daily Price Value | $200 |
|---|---|
| Savings Value | $50 |
| Adjusted Base Price Value | $150 |
| Charity Donation Value | $25 |

| | Reward | Wed 4/21/2004 | Thur 4/22/2004 | Fri 4/23/2004 | TOTAL |
|---|---|---|---|---|---|
| 640 → | Hotel Price | $200 | $200 | $200 | $600 |
| 644 → | Virtual Currency Reward | $50 | $50 | $50 | $150 |
| 642 → | Your Hotel Cost after Reward | $150 | $150 | $150 | $450 |

646 spans Wed, Thur, Fri columns; 648 → TOTAL

650 →

| Virtual Cash Account | Balance |
|---|---|
| Opening Balance | $500 |
| Current use of Virtual Cash | $150 |
| Remaning Virtual Cash | $350 |

| Reward | Wed 4/21/2004 | Thur 4/22/2004 | Fri 4/23/2004 | TOTAL |
|---|---|---|---|---|
| Hotel Price | $200 | $200 | $200 | $600 |
| Partner - Issued Currency Contribution | $50 | $50 | $50 | $150 |
| Your Hotel Cost after Partner - Issued Currency Contribution | $150 | $150 | $150 | $450 |

| Virtual Cash Account | Balance |
|---|---|
| Opening Balance | $500 |
| Current use of Partner - Issued Currency | $150 |
| Remaning Partner - Issued Currency | $350 |

FIG - 25

Airline Co.

Account Summary

Acct.Miles # 100000

Miles Balance: 8,921

Miles used: 0

Log Out | Shopping Cart

---

Use Miles and Money

Hotel
Condominiums — 1604
Merchandise
Gift Cards

---

Account
Help
Contact — 1610

---

Your Questions

Are there any cancellations penalties? How do I cancel a hotel reservation?

---

Check-in-date ☐
[Apr ▼] [13 ▼] [2006 ▼]

Check-out-date ☐
— 1608

Hotel Search Results
Boston, MA
Apr 13, 2006 - Apr 21, 2006
We are constantly adding new properties to our database. If you don't see the hotel of your choice, please check our website at a later date.

Sort By:  ○ Destination Picks  ● Rate After Miles

Hotel 1  Address: 123 Smith St. Anywhere, USA
Lodging Information
Map | Directions

- 2 Double Bed Room
- 4 Other Room Types. — 1602

| Rewards | Wed 4/21/03 | Thur 4/22/03 | Fri 4/23/03 | Total |
|---|---|---|---|---|
| Lowest Hotel Price | $219 | $219 | $219 | $657 |
| Miles | 1000 | 1000 | 1000 | 3000 |
| Rate After Miles | $95 | $95 | $95 | $285 |

Hotel 2  Address: 123 Jones St. Anywhere, USA
Lodging Information
Map | Directions

- 2 Double Bed Room
- 4 Other Room Types.

— 1606

| Rewards | Wed 4/21/03 | Thur 4/22/03 | Fri 4/23/03 | Total |
|---|---|---|---|---|
| Lowest Hotel Price | $200 | $200 | $200 | $600 |
| Miles | 1000 | 1000 | 1000 | 3000 |
| Rate After Miles | $150 | $150 | $150 | $450 |

*Pricing and Availability subject to change. Click pricing

SYSTEM AND METHOD FOR PROVIDING A DISCOUNT

REFERENCE TO RELATED APPLICATIONS

This application is a continuation of U.S. patent application Ser. No. 12/044,535, filed Mar. 7, 2008, which is a continuation-in-part of U.S. patent application Ser. No. 11/049,608, filed Feb. 2, 2005, now U.S. Pat. No. 7,925,533, which claims priority from U.S. Provisional Patent Application Ser. No. 60/541,220, filed Feb. 2, 2004.

U.S. patent application Ser. No. 12/044,535 also claims priority from U.S. Provisional Patent Application Ser. No. 60/894,059, filed Mar. 9, 2007. The entire content of each application is incorporated herein by reference.

FIELD OF THE INVENTION

Systems and methods provided by the invention relate to systems and methods for providing a discount. In particular, inventive systems and methods relate to systems and methods for providing a discount using a partner-issued currency or a combination of virtual currency and partner-issued currency.

BACKGROUND OF THE INVENTION

Providing a discounted retail price on a product or service is a time-honored method of increasing sales, increasing brand, product and service visibility and expanding the market for the product or service. However, providing a discount is a method to be used with care since frequent discounting may lead to a customer perception of decreased value such that customers are unwilling to pay the retail value under any circumstances.

A recent trend in discounting has been the association of a discount with "points," "miles," or other form of non-cash currency accumulated in order for the customer to realize a discount on a product or service. Such "mileage" or "point" accounts have the advantage of heightening customer loyalty to a particular product or service provider as well as providing the perception that "extra" value is received when points or miles are delivered along with the purchased product. Nevertheless, in spite of the benefits of such loyalty point program discounting methods, the disadvantages of such schemes often outweigh the advantages. For example, a delivery of "points," "miles," or other form of non-cash currency to a customer requires the product or service provider to incur an expense on its income statement and carry liability for redemption of the virtual currency on the books. Management of virtual currency accounts implicates significant costs to the product or service provider. Additionally, customers are often frustrated with limitations on "spending" their accumulated non-cash currency.

Thus, there is a continuing need for systems and methods for providing a discount using a virtual currency which provides high-perceived savings value to a customer while maintaining the perception of product value. It would be a tremendous benefit to service and product providers who maintain "points," "miles," or other form of non-cash currency accounts to allow customers to "spend" such non-cash currency at little or no cost to the providers.

Thus, systems and methods for providing a discount are needed which require little or no cost to the service or product provider. In addition, systems and methods for providing a discount are needed which allow a customer to spend non-cash currency require little or no cost to the non-cash currency provider.

SUMMARY OF THE INVENTION

A method for providing a discount to an end-user according to an embodiment of the invention includes the step of receiving an end-user request for price information associated with a product or service. Also included are steps of retrieving a daily price value of the product from a first database, retrieving a base price value of the product from a second database, and calculating a difference between the retrieved daily price value and the retrieved base price value to determine a margin value. A further step includes allocating a portion of the margin value to an entity other than the end-user, such as an administrator, charity or other. Another step includes increasing the base price value by an amount equal to the amount allocated to the entity to determine an adjusted base price value of a product, the adjusted price value being indicative of an amount of actual currency to be paid by the end-user. Calculation of the difference between the retrieved daily price value and the adjusted base price value results in a savings value of the product. The savings value is indicative of an amount of a partner-issued currency or a combination of virtual currency and partner-issued currency to be paid by the end-user. Further, the retrieved daily price value of the product, the adjusted base price value of the product and the savings value of the product are presented to the end-user. Where the end-user decides to purchase the product, an end-user request to purchase the product is received. A determination that the end-user has an amount of available partner-issued currency or a combination of virtual currency and partner-issued currency at least equal to the amount of the savings value is made and an amount of partner-issued currency or a combination of virtual currency and partner-issued currency equal to the presented savings value is subtracted from the amount of partner-issued currency or combination of virtual currency and partner-issued currency available to the end-user. A further step includes receiving details from the end-user indicating payment of actual currency in an amount at least equal to the adjusted base price value, thereby providing a discount to the end-user.

In a preferred embodiment, the product is a hotel stay. In further preferred embodiments the product is airline travel, a condominium stay, a cruise trip, travel related merchandise, luggage, a theatrical ticket, a video cassette recording, a DVD, an audio recording, a restaurant product, an article of clothing, an appliance, an electronic device; lawn care, home improvement, a repair service, a personal care service, and a pet care service.

Also preferred is an inventive method including a step of presenting the retrieved daily price value of the product, the adjusted base price value of the product and the savings value of the product to the end-user in tabular form.

Also detailed herein is an inventive method for providing a discount to a end-user including some steps described above but wherein a determination is made that the end-user does not have an amount of available partner-issued currency or a combination of virtual currency and partner-issued currency at least equal to the amount of the savings value. In such a case, an embodiment of an inventive method includes the steps of calculating a difference between the amount of available partner-issued currency or combined of virtual currency and partner-issued currency and the amount of the savings value to determine an amount of a deficiency of partner-issued currency or a combination of virtual currency and partner-issued currency, and notifying the end-user that the amount of the deficiency may be paid in actual currency. In the event that the end-user decides to purchase the product, a end-user request to purchase the product is received and details are further received from the end-user indicating payment of actual currency in an amount at least equal to the adjusted base price value and the amount of the deficiency, thereby providing a discount to the end-user.

Another embodiment details a method for providing a discount offer to an end-user which includes the steps of retrieving a daily price value of a product from a first database, retrieving a base price value of a product from a second database and calculating a difference between the retrieved daily price value and the retrieved base price value to determine a margin value. A portion of the margin value is optionally allocated to an entity other than the end-user and the base price value is increased by an amount equal to the amount allocated to the entity to determine an adjusted base price value of a product. The adjusted price value is indicative of an amount of actual currency to be paid by the end-user. In an additional step a difference between the retrieved daily price value and the adjusted base price value is calculated to determine a savings value of a product, the savings value indicative of an amount of a partner-issued currency or a combination of virtual currency and partner-issued currency to be paid by the end-user. Further, the retrieved daily price value of a product, the adjusted base price value of a product and the savings value of a product are presented to the end-user, thereby providing a discount offer to the end-user.

In a further embodiment, a system is detailed for providing a discount or a discount offer to an end-user which includes a device having a data input and output element, processing circuitry, memory circuitry and an executable program for performing a method as described herein.

BRIEF DESCRIPTION OF THE DRAWINGS

FIG. 11 is a block diagram illustrating an embodiment of an inventive method including a step of maintaining a database;

FIG. 12A is a drawing illustrating tabular presentation of product price information presentation;

FIG. 12B is a drawing illustrating tabular presentation of product price information presentation along with an amount of a charitable donation;

FIG. 13 is a drawing illustrating a tabular presentation of price information in an embodiment in which the product of interest is a hotel stay;

FIG. 14 is a drawing illustrating a tabular presentation of information regarding an end-user's virtual currency account;

FIG. 24 is a drawing illustrating a tabular presentation of price information in an embodiment in which the product of interest is a hotel stay;

FIG. 25 is a drawing illustrating a tabular presentation of information regarding an end-user's partner-issued currency account;

FIG. 26 is a drawing illustrating an end-user interface in the form of a web page.

DETAILED DESCRIPTION OF THE INVENTION

Figure 1:
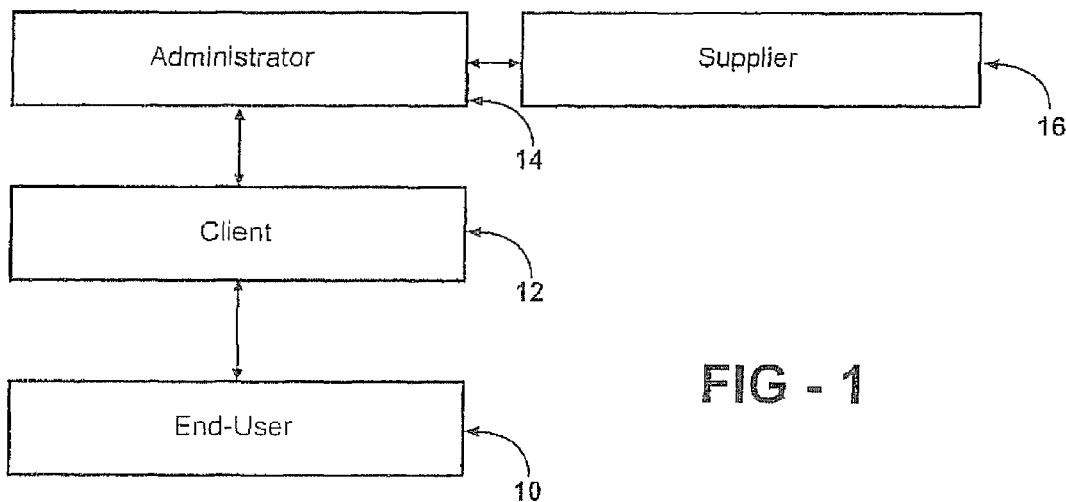
FIG. 1 is a drawing illustrating relationships between various participants in an embodiment of an inventive system.

A system and method for providing a discount to an end-user are provided. In particular, systems and methods for delivering a discount using a partner-issued currency or a combination of virtual currency and partner-issued currency are provided which offer a high perceived savings value to a customer while maintaining the perception of product value in the public view. Further, systems and methods for providing a discount are described which impose little or no cost on the service or product provider. Additional embodiments of systems and methods allow a partner-issued currency to be used to obtain a discount such that the partner-issued currency is "spent" at little or no cost to the partner.

For example, an embodiment of an inventive method broadly includes providing a virtual currency to an end-user and responding to an end-user inquiry regarding a product price by presenting the end-user with a display of a price paid by an average consumer without access to the virtual currency along with a display of an amount payable in actual currency in combination with an amount payable in virtual currency by the end-user. The end-user perceives a benefit to using the virtual currency since the price paid in actual currency is less than the displayed price to be paid by a consumer without access to the virtual currency.

The term 'actual currency' as used herein is intended to mean government or bank notes generally accepted as currency, such as dollars.

In contrast, the term 'virtual currency' is intended to mean a form of currency created by an administrator of a system or method according to the present invention. In a preferred embodiment, the virtual currency is presented to the end-user using terms associated with actual currency. For example, virtual currency is illustratively called 'virtual dollars,' or the like. In a preferred embodiment, virtual currency is given to a client who pays for creation and maintenance of end-user accounts. In a highly preferred embodiment, an administrator authorizes a client to distribute an amount of virtual currency without a "dollar for virtual dollar" charge by the administrator to the client. That is, an administrator charges a client a fee for management of an end-user account, but the charge for such management may be the same no matter whether the client decides to award 10 virtual dollars or 10,000 virtual dollars, or any other amount of the virtual currency, to the end user. In a highly preferred embodiment, a client is not "credited" with an amount of virtual currency by an administrator such that when an amount of virtual currency is distributed to an end-user by a client, an amount equal to that distributed is deducted from any total allocated to the client. Rather, in such a highly preferred embodiment, the client is authorized to distribute as much or as little of the virtual currency to an end-user as desired.

The term "partner" as used herein is intended to mean an entity having a business relationship with an administrator. The partner issues its own form of non-actual currency, termed "partner-issued currency." The business relationship between an administrator and partner establishes the ability of an end-user to use a partner-issued currency or a combination of virtual currency and partner-issued currency to obtain a discount on a product and/or service according to a method and/or system of an embodiment of the present invention. In general, where a partner-issued currency is used to obtain a discount, the end-user typically has a relationship with the partner, such as merchant/customer, service provider/customer, which results in the delivery of the partner-issued currency to the end-user.

The term "partner-issued currency" as used herein is intended to mean a form of currency created by a partner and which is not an actual currency. Exemplary partner-issued currencies include "miles," "points," and non-governmentally-issued "dollars."

In a further preferred embodiment, the virtual currency is given to an end-user by a client. The virtual currency is optionally sold to a client for actual currency or other consideration. In a further embodiment, a 'virtual currency dollar' is optionally sold for less than an 'actual currency' dollar.

Also preferred is an embodiment in which a virtual currency distributed to an end-user has no expiration date.

In describing inventive systems and methods, the term 'administrator' as used herein is intended to mean an entity that creates a virtual currency and authorizes a right to use a virtual currency. An administrator further administers end-user accounts and relationships with clients and suppliers.

The term 'client' as used herein is intended to mean one who 'buys' the virtual currency. The client may also be termed a "client" of the administrator.

The term 'end-user' or 'user' as used herein is intended to mean the individual who has an account for the partner-issued currency and/or the virtual currency and/or uses the virtual currency and/or partner-issued currency to get a savings/discount on a product or service.

The client may be an end-user, but in a preferred option, the client is an entity who distributes the virtual currency to an end-user after acquiring it from the administrator. Such "distribution" of a virtual currency preferably takes the form of providing the end-user with notification of information operable to access an end-user account. For example, the end-user may be provided with a card or letter having included password information operable to access an end-user account having an amount of a virtual currency available for the end-user. Generally, the client and end-user have a relationship, such as employer/employee, merchant/customer, service provider/customer and the like.

The term 'supplier' as used herein is intended to mean one who provides a product or service for which a discount/savings value is provided. In general, the supplier is an entity directly involved in supplying the product or service, such as an airline, hotel, or manufacturer.

The term "intermediary" as used herein is intended to mean an entity which provides access to price information relating to a product. In one embodiment, an intermediary maintains a database of price information relating to a product. In such an embodiment, an intermediary receives information for database update periodically or continuously. In another embodiment, an intermediary provides a "switch service," linking an administrator to databases maintained by one or more suppliers. Such a switch service is exemplified by that provided by Pegasus Solutions, Inc. An intermediary has a relationship with an administrator such that the administrator is authorized to retrieve information from the intermediary database and/or through an intermediary provided switch to a supplier database. Further, an intermediary may provide access to a computer system of a supplier such that an administrator can reserve a supplier's product.

The term 'daily price value' as used herein is intended to mean a product or service price established by a supplier and displayed to the end-user. The 'daily price value' may vary considerably with time, especially in some industries, such as the hotel industry. Thus, the 'daily price value' may be established by the supplier as valid for a particular period of time, after which the inventive system and method incorporate a new 'daily price value.' While the term "daily price value" may indicate that the daily price value is established daily, it is understood that the daily price value may fluctuate with the market for the product or service and that therefore the daily price value may be established as valid for more or less than one day. As discussed below, in one embodiment, the 'daily price value' is determined by obtaining the 'daily price value' from the supplier upon end-user demand. In one example, a daily price value in the context of the hotel industry may be the price which would be paid by an average consumer or the best price on the hotel's own website. Typically such a price is lower than the industry defined "rack rate."

The term "base price value" as used herein refers typically to the price which is a basis for the calculated amount which the end-user pays using 'actual currency.' The base price value is optionally negotiated by the supplier and the administrator. In a further option, the base price value is set by the administrator.

The term 'margin' as used herein is intended to mean a value which represents the difference between the daily price value and the base price value.

The term "adjusted base price value" as used herein is used to refer to the amount which the end-user pays using 'actual currency.' The base price value is adjusted by a fractional percent of the margin ranging between 0-99% of the margin. For example, in one embodiment, the difference between the daily price value and the base price value, the margin, is presented to the end-user as the savings value. In such a case the base price value is adjusted by 0% and the adjusted base price value is therefore equal to the base price value. However, in a further embodiment, a share of the difference between the daily price value and the base price value may by apportioned to the administrator, another participant in an inventive system/method, such as the client, or to a another entity, such as a charitable organization. The share apportioned to the administrator, or other, ranges from 0.001-99% of the margin. In such cases the "base price value" is adjusted upwards to reflect the amount apportioned to another as described, resulting in an "adjusted base price value." The adjusted base price value can be paid in actual currency using cash, but preferably, is paid using a credit or debit card by end-user supplied information communicated over a communications network, such as by Internet transaction.

The terms 'discount value' or 'savings value' as used herein is intended to mean a value presented to an end-user which represents the difference between the daily price value and the adjusted base price value. In a preferred embodiment, the savings value is distinguished from the adjusted base price value in that the savings value is paid using virtual currency. In one embodiment, the savings value may be paid with a mix of virtual and actual currency, whereas the base price value is paid using actual currency.

The 'adjusted base price value' is optionally and preferably a value displayed to the end-user along with the daily price value and the savings value.

A system for providing a discount to an end-user is described herein. FIG. 1 depicts relationships between various participants in an embodiment of an inventive system. In a particular embodiment, the end-user 10 and client 12 preferably have a relationship such as employee/employer or customer/merchant or customer/service provider. In an embodiment in which the end-user/client have an employee/employer relationship, virtual currency may be given to the employee by the employer as a reward, such as a reward for years of service, on-time behavior, attendance, performance, loyalty to the employer, or the like. In an embodiment, in which the end-user/client have a customer/merchant or customer/service provider relationship, virtual currency may be given to the customer as a reward for loyalty, years of mutual association, relationship reinforcement tool and the like.

The client 12 and administrator 14 have a relationship in which the client arranges for the administrator to provide end-user accounts and authorize distribution of a virtual currency. In a preferred embodiment, the client pays the administrator to maintain, update and otherwise oversee the end-user accounts provided to the client. In a highly preferred embodiment, an administrator authorizes a client to distribute an amount of virtual currency without a "dollar for virtual dollar" charge by the administrator to the client. That is, an administrator charges a client a fee for management of an end-user account, but the charge for such management may be the same no matter whether the client decides to award 10 virtual dollars or 10,000 virtual dollars, or any other amount of the virtual currency, to the end user. In a highly preferred embodiment, a client is not "credited" with an amount of virtual currency by an administrator such that when an amount of virtual currency is distributed to an end-user by a client, an amount equal to that distributed is deducted from any total allocated to the client. Rather, in such a highly preferred embodiment, the client is authorized to distribute as much or as little of the virtual currency to an end-user as desired. In another embodiment, the client pays the administrator for an amount of virtual currency to be made available to an end-user.

An administrator 14 establishes a relationship with a supplier 16 in order to provide goods or services to an end-user for which the end-user can obtain a discount.

Figure 2:
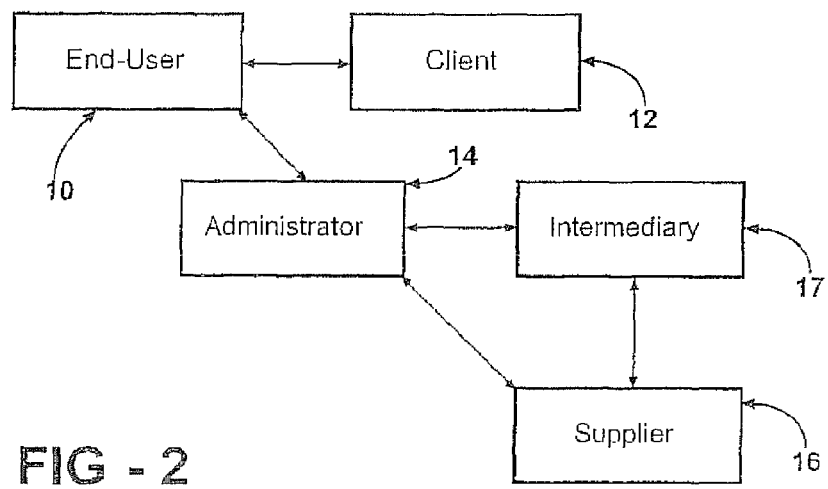
FIG. 2 is a drawing illustrating exemplary participant entities in an embodiment of an inventive system and method.

FIG. 2 illustrates exemplary participant entities in an embodiment of an inventive system and method including an end-user 10, client 12, administrator 14 and supplier 16 as described above, and additionally depicts an intermediary 17. In one embodiment of an inventive system and method, an intermediary 17 has relationships with a supplier and an administrator. An intermediary may provide a database having price information contributed by a supplier and available for retrieval by an administrator.

Figure 3:
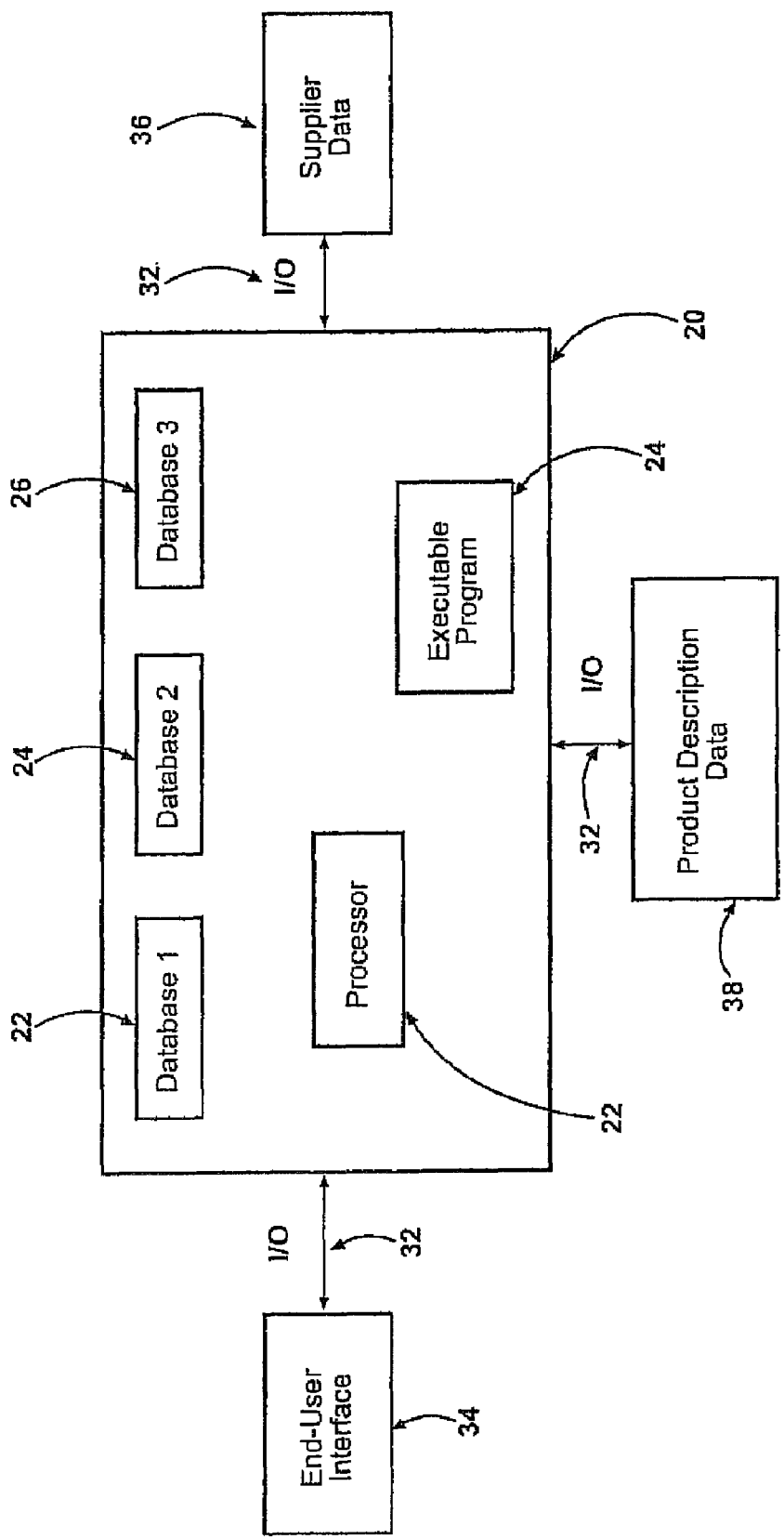
FIG. 3 is a drawing illustrating an embodiment of an inventive system including memory circuitry.

An inventive system preferably includes data input and output capacity, processing circuitry, memory circuitry and an executable program for carrying out one or more steps in an inventive method. FIG. 3 schematically depicts an embodiment of a system 20. Shown is an embodiment of an inventive system including a processor 22 and executable instructions 24 in a computer-readable medium for performing one or more steps in an inventive method. FIG. 3 further illustrates exemplary input and output components 32 linking an end-user interface 34, supplier data 36 and product description data 38 with processor and program components.

As shown in FIG. 3, an embodiment of an inventive system 20 preferably includes memory circuitry such as a database 22, and may include a plurality of databases, exemplified at 24 and 26. In a preferred option, an embodiment of an inventive system includes a database containing end-user identifying information. Typically, end-user identifying information includes one or more identifiers such as an end-user's actual name, an end-user's virtual name such as one used for purposes of computer login, an end-user password for computer login, end-user address, telephone number, credit card information, product interests, system account number, and the like.

Further examples of data optionally included in a database of an inventive system include end-user account information, such as the amount of virtual currency in the account, past purchase information, source of the virtual currency, and the like. Additional examples of data optionally included in a database of an inventive system include base price values associated with a product or service, daily price information, supplier information, such as product descriptions and client information.

Components of an embodiment of an inventive system may be included in any type of computer system such as a personal digital assistant, personal computer, workstation, server or mainframe computer. In addition, components of an inventive system, such as a plurality of databases, may be distributed in more than one computer device connectable by a wired or wireless connection.

An inventive system preferably includes an input component for communication of end-user requests or other information, such as daily price information from a supplier. Input components include network communication links for example, such as Internet links.

An inventive system preferably includes an output component for communication with an end-user or others. Output components include network communication links for example, such as Internet links.

Figure 4:
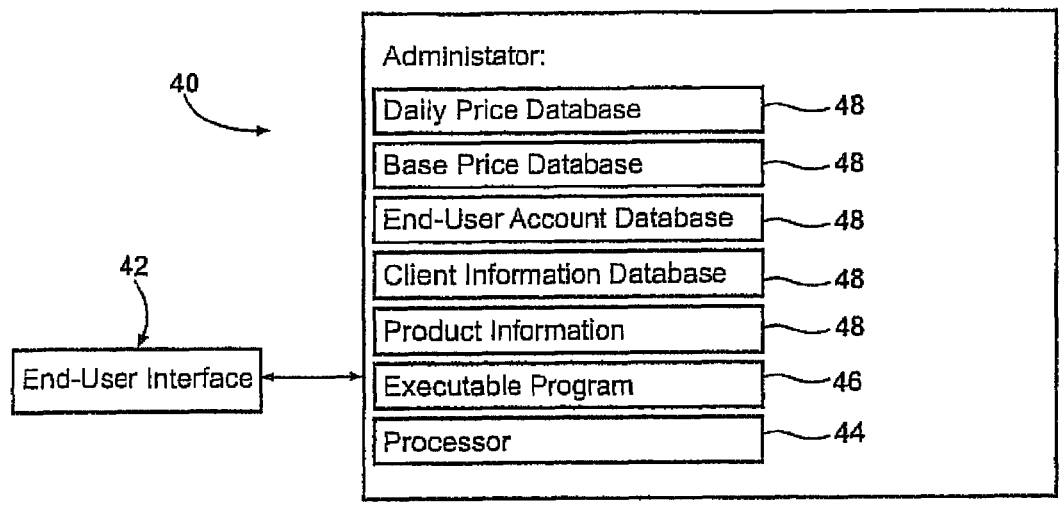
FIG. 4 is a drawing illustrating an embodiment of an inventive system in which an end-user interface is provided along with processing circuitry and an executable program for carrying out one or more steps in an inventive method.

FIG. 4 illustrates an embodiment of an inventive system 40 in which an end-user interface 42 is provided along with processing circuitry 44, and an executable program 46 for carrying out one or more steps in an inventive method. Also included is memory circuitry 48 including a daily price database, a base price database, an end-user account database, a client information database, and a product information database. In an illustrated embodiment, database components are administrator controlled, such that an active connection to a client, supplier, or intermediary database is unnecessary to carry out a step of an inventive method. For example, in such an embodiment, a daily price value is stored in a database controlled by an administrator such that a real-time inquiry to another entity for a daily price value is unnecessary to calculate a savings value, present price information to an end-user and complete a transaction in which an end-user receives a discount on a product or service.

Figure 5:
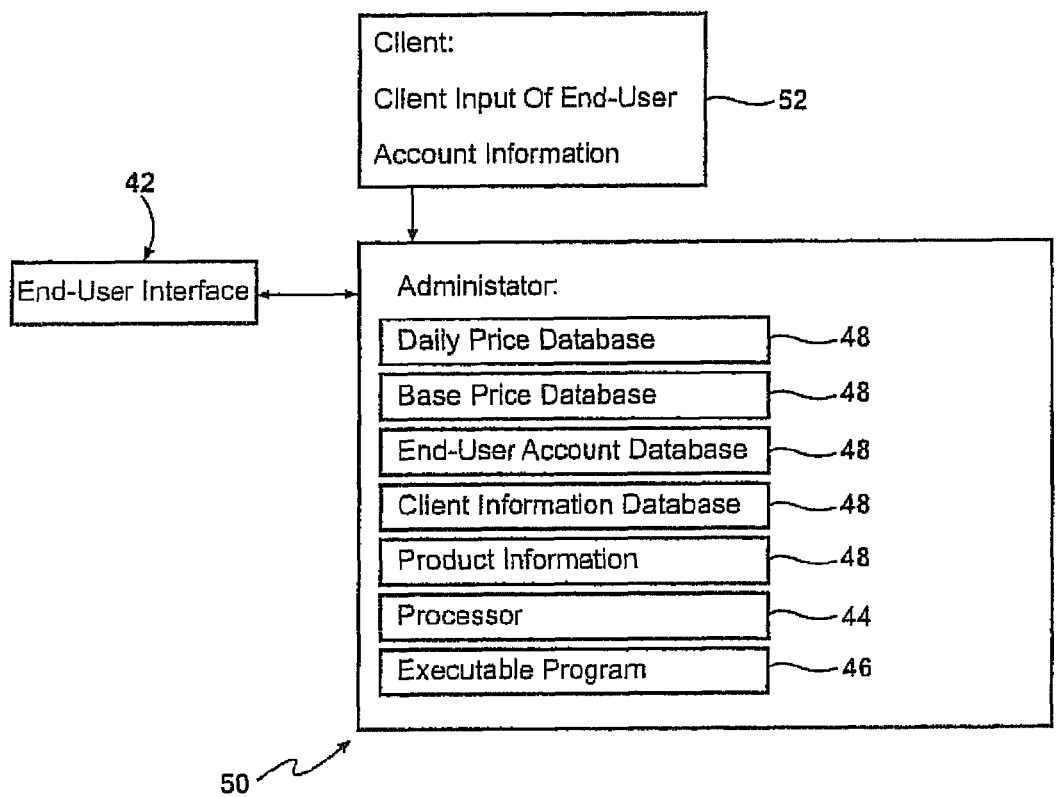
FIG. 5 is a drawing illustrating an embodiment of an inventive system in which an end-user interface is provided along with processing circuitry and an executable program for carrying out one or more steps in an inventive method.

FIG. 5 illustrates an embodiment of an inventive system 50 in which an end-user interface 42 is provided along with processing circuitry 44, and an executable program 46 for carrying out one or more steps in an inventive method. Also included is memory circuitry 48 including a daily price database, a base price database, an end-user account database, a client information database, and a product information database. In an illustrated embodiment, some database components are administrator controlled. In addition, a client interface 52 is provided in an illustrated embodiment, allowing for client input of end-user account information, such as a list of end-users and amounts of a virtual currency to be added to end-user accounts. Such information may be input to directly update an end-user account. Alternatively, such information may be transmitted to an administrator, such as by e-mail or FTP download of information for instance, for administrator entry.

Figure 6:
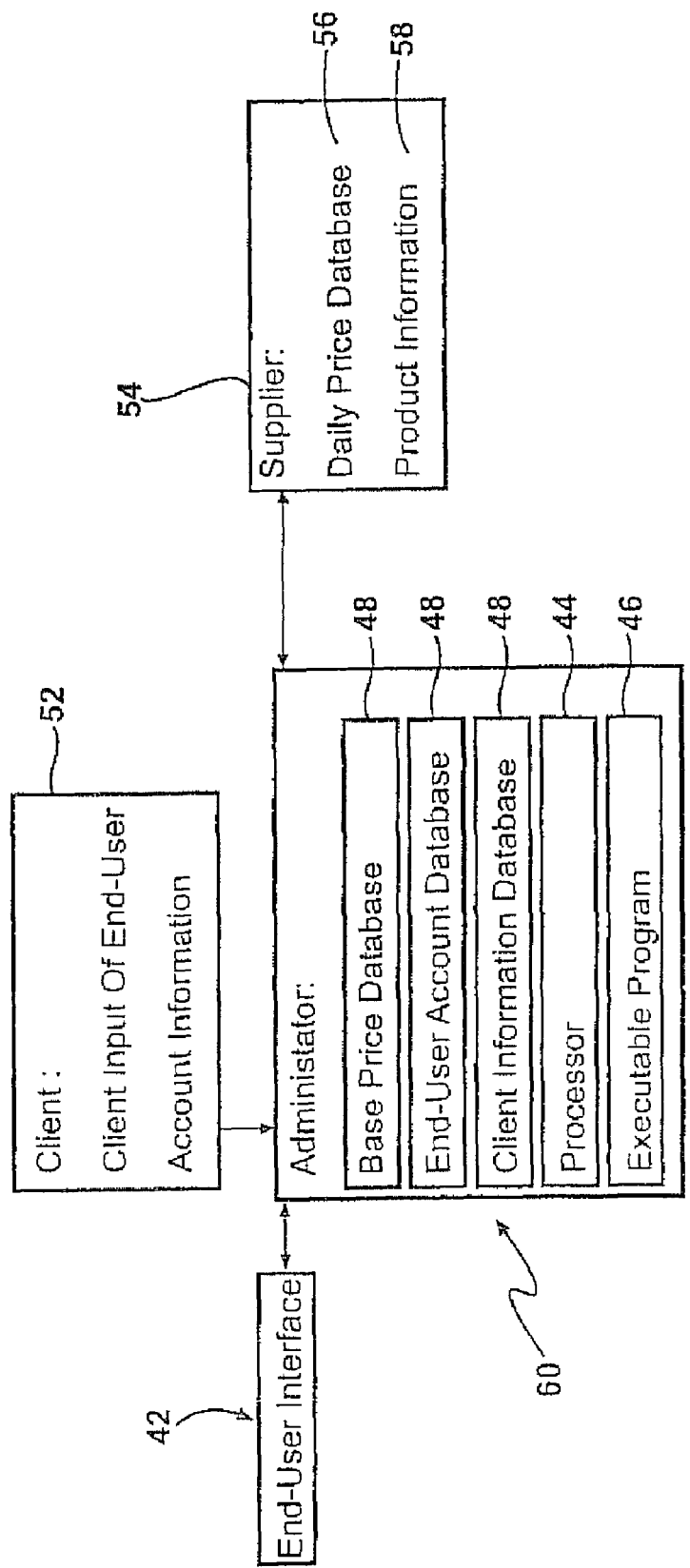
FIG. 6 is a drawing illustrating an embodiment of an inventive system in which an end-user interface is provided along with processing circuitry and an executable program for carrying out one or more steps in an inventive method.

FIG. 6 illustrates an embodiment of an inventive system 60 in which an end-user interface 42 is provided along with processing circuitry 44, and an executable program 46 for carrying out one or more steps in an inventive method. Also included is memory circuitry 48 including a base price database, an end-user account database, and a client information database. In an illustrated embodiment, some database components are administrator controlled. In addition, an optional client interface 52 is illustrated. Further depicted are supplier components 54. In a particular embodiment, a supplier controls a daily price value database 56 which may be accessed by an administrator to retrieve a daily price value. In addition, a supplier may optionally provide product information 58. For example, a supplier may present product information on a web page controlled by the supplier and the administrator may provide a link to the information to an end-user. Such product information illustratively includes such information as a description of the product, a technical specification of the product, an illustration of the product, a location of the product, a map showing the location of the product, a critical review of the product, instructions on use of the product, combinations thereof, and the like.

Figure 7:
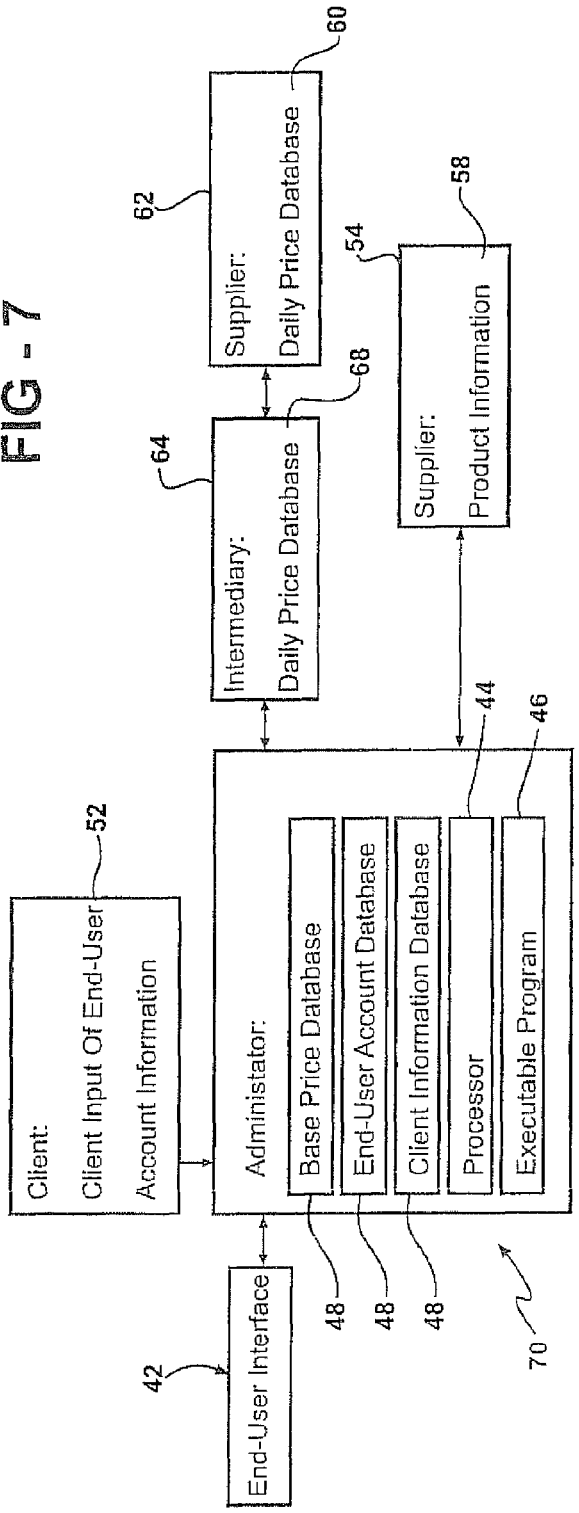
FIG. 7 is a drawing illustrating an embodiment of an inventive system in which an end-user interface is provided along with processing circuitry and an executable program for carrying out one or more steps in an inventive method.

FIG. 7 illustrates an embodiment of an inventive system 70 in which an end-user interface 42 is provided along with processing circuitry 44, and an executable program 46 for carrying out one or more steps in an inventive method. Also included is memory circuitry 48 including a base price database, an end-user account database, and a client information database. In an illustrated embodiment, some database components are administrator controlled. An optional client interface 52 is also shown. Further, a supplier provided component 54 is illustrated and may include product information 58. For example, a supplier may present product information on a web page controlled by the supplier and the administrator may provide a link to the information to an end-user. In a particular embodiment, a supplier provided component 62 is communicated to an intermediary 64 which provides access to an administrator. In particular, a supplier provided component 62 communicated to an intermediary 64 includes a supplier database 60 containing daily price value information.

Figure 8:
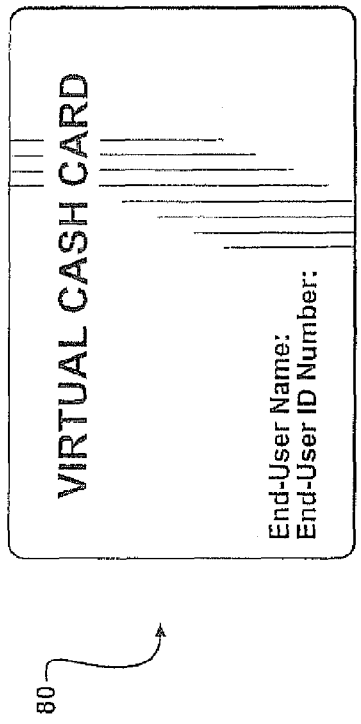
FIG. 8 is a drawing illustrating an end-user card optionally included in an inventive system or method.

Optionally included in an inventive system is an end-user card. Such a card is illustrated in FIG. 8 at 80 and includes information such as end-user name, end-user account number, end-user account password, administrator identifying information such as a logo or company name, client identifying information such as a logo or company, and the like. Preferably, the card is presented to the end-user as a convenient reminder of account information and affiliation information. Typically the card is not necessary to use an inventive system or method. However, optionally, a memory chip is included in the card and contains such information as account data and the like. A card may be supplied in any of various formats, illustratively including a standard credit card size, about 1 mm thick, and a 'thin' credit card size, about 0.5 mm thick, which can be imprinted with information for example by embossing or laser printing. The card optionally contains such information as the tennis and conditions of the system and method of use, instructions for use, a list of the most commonly asked questions with answers, and the like.

Figure 9:
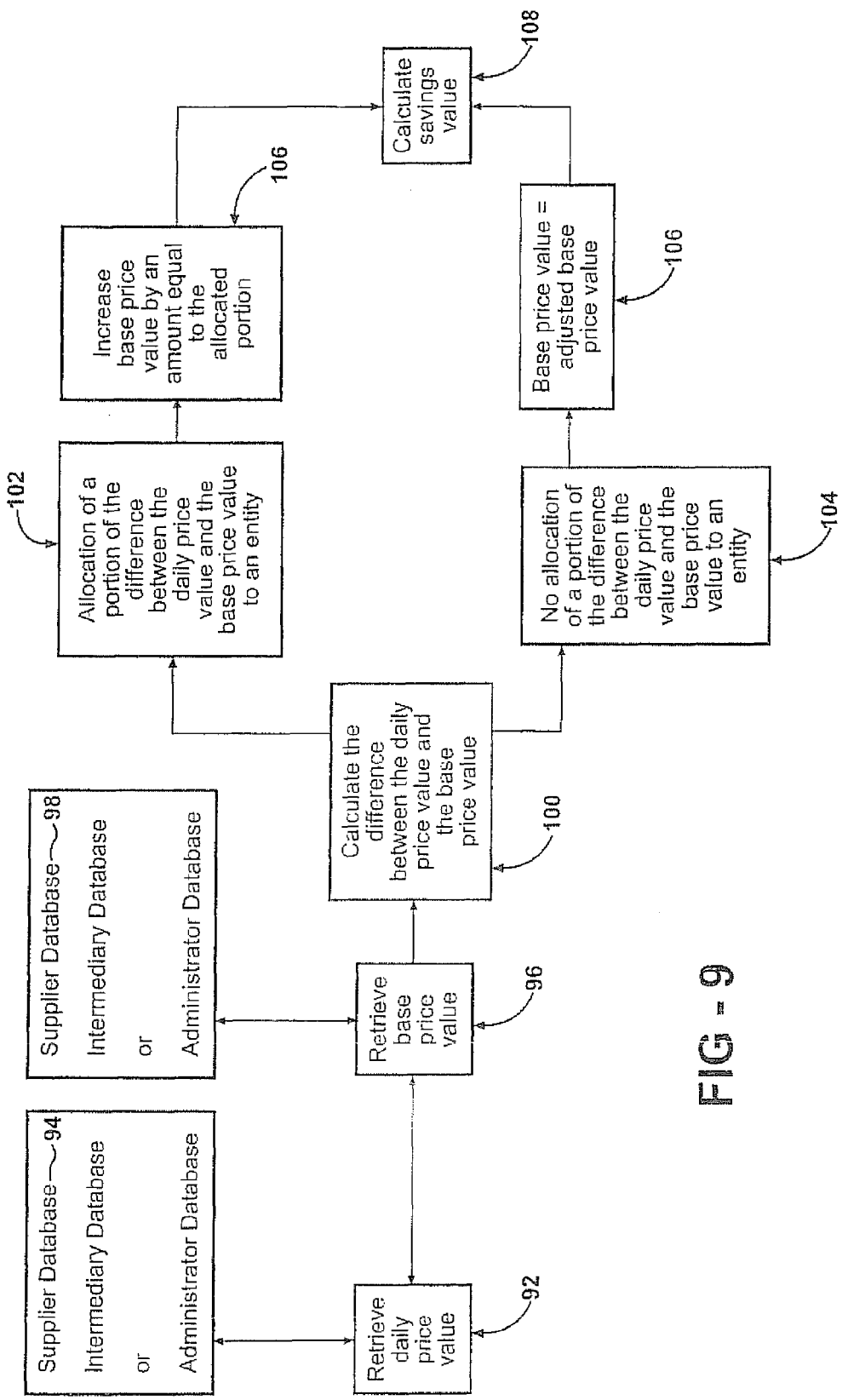
FIG. 9 is a block diagram illustrating an embodiment of an inventive method.

A method of providing a discount according to the invention includes a number of steps described herein, some of which are optional. An exemplary embodiment of an inventive method is illustrated in FIG. 9. Steps are depicted in illustrative order and applicant does not intend to limit an inventive method to one having steps performed in the order illustrated or described herein.

An embodiment of an inventive method includes a step 92 of retrieving a daily price value. A daily price value is retrieved from a database 94, such as a supplier database, intermediary database or administrator database.

A further step 96 in an embodiment of an inventive method includes retrieving a base price value. A base price value is retrieved from a database 98, such as a supplier database, intermediary database or administrator database.

In an additional step 100 of an embodiment of an inventive method, a difference between the retrieved daily price value and the retrieved base price value of a product or service is calculated to determine a margin value. The margin value represents the high end of a range of potential savings values to be presented or given to an end-user for use in purchasing a product or service. In a preferred embodiment, an inventive method includes a step 102 of allocating a portion of the margin to an entity other than the end-user. In a further preferred embodiment, a portion of the margin is allocated to more than one entity other than the end-user. In an alternative step 104, no allocation is made. An entity to whom a portion of the margin is allocated illustratively includes an administrator, a client, a supplier, an intermediary or other. In a preferred embodiment, a portion of the margin is allocated to the administrator. In another preferred embodiment, a portion of the margin is allocated to a charity.

A benefit formula is applied to the margin value to calculate a savings value to the end-user. The benefit foimula optionally incorporates terms defining a percentage of the margin value to be allocated to an entity and a term for an amount allocated to an entity to calculate a savings value. The percentage of the margin value allocated to the entity ranges from 0-99% of the margin.

For example, in one embodiment of a benefit formula applied to a margin, a term for an amount allocated to an entity to calculate a savings value is expressed as: $(Z \times Y)$ an amount allocated to an entity, where Z is the margin value and Y is the % of the margin value allocated to an entity.

In one embodiment, a further step 106 in an inventive method includes adjusting the base price value. The base price value is adjusted by an amount equal to the amount allocated to an entity as described. Such an amount will represent a fractional percent of the margin ranging between 0-99% of the margin, as described. For example, in one embodiment, the difference between the daily price value and the base price value, the margin, is presented to the end-user as the savings value. In such a case the base price value is adjusted by 0% and the adjusted base price value is therefore equal to the base price value. However, in a further embodiment, a share of the difference between the daily price value and the base price value may by apportioned to the administrator, another participant in an inventive system/method, such as the client, or to a another entity, such as a charitable organization. The share apportioned to the administrator, or other, ranges from 0.001-99% of the margin. In such cases the "base price value" is adjusted upwards to reflect the amount apportioned to another as described, resulting in an "adjusted base price value."

In a further step 108 of an embodiment of an inventive method, a savings value is calculated, such as by application of a benefit formula.

For example, in one embodiment a benefit formula applied to a margin is expressed as: $Z-(Z \times Y)$=savings value, where $Z$ is the margin value, $Y$ is the % of the margin value allocated to an entity and $(Z \times Y)$ is the amount of the margin value allocated to the entity.

Figure 10:
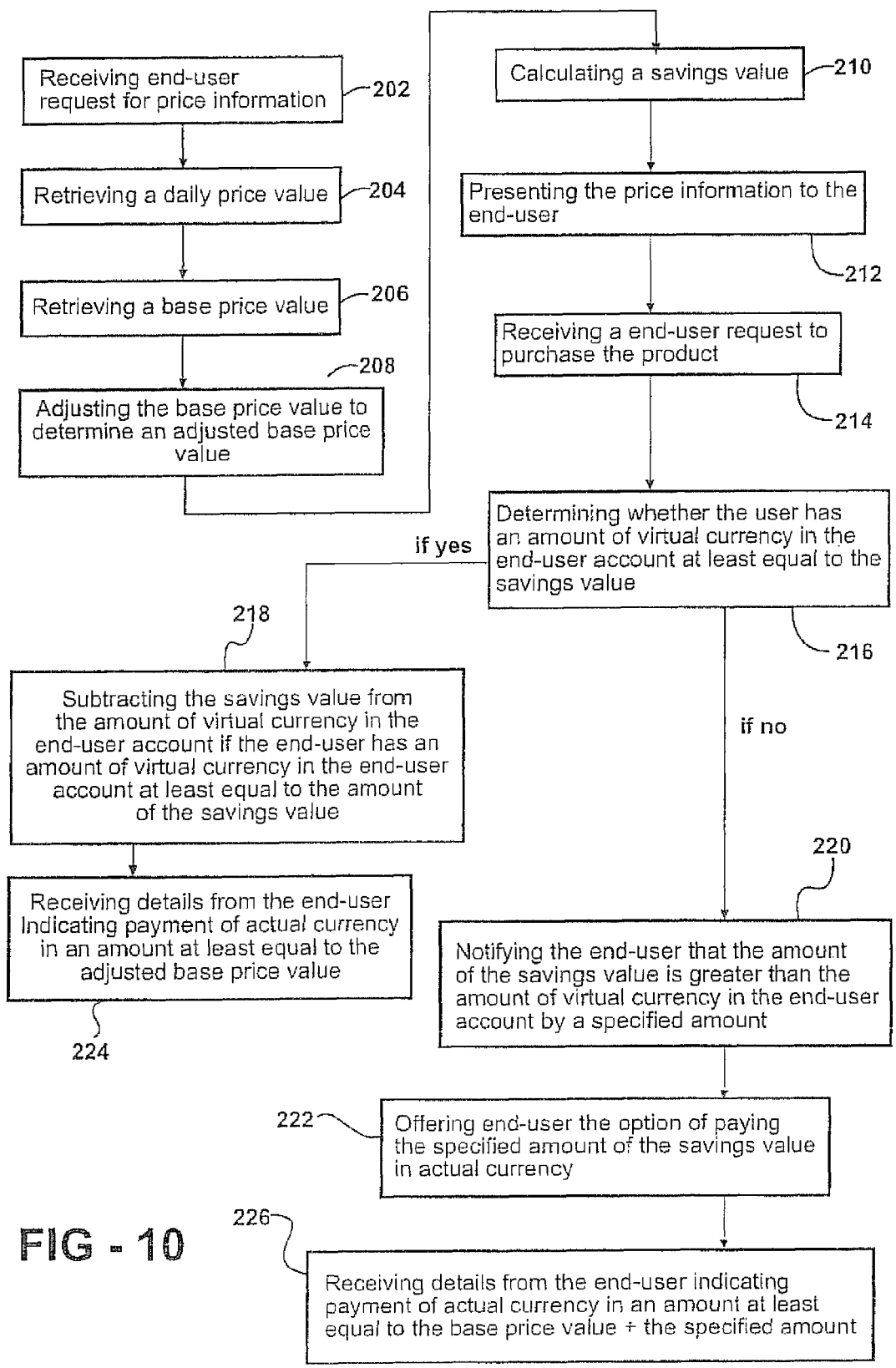
FIG. 10 is a block diagram illustrating an embodiment of an inventive method.

Further provided by the present invention is an embodiment of an inventive method including steps depicted in FIG. 10. An illustrated embodiment of an inventive method includes the step 202 of receiving an end-user request for price information associated with a product or service. In a preferred embodiment, the end-user request is received over a communications network, such as a wireless or wired LAN, WAN, or other network, including, the "internet." For example, the end-user preferably uses a computer or other electronic device capable of receiving Internet communications to access a web page displaying information indicating participation in an inventive method. The web page optionally displays administrator information such as name and/or logo. In a further option, the website displays client information such that the end-user associates the savings value with the identity of the client. Alternatively, the end-user may request the price information by telephone or in person from a representative.

A further step 204 includes retrieving a daily price value associated with the product or service for which the end-user has requested information. Since the daily price value may vary considerably with time, the daily price value may be established by the supplier as valid for a particular period of time. For instance, the supplier may stipulate that a given daily price value is good for one month after issue for a particular product or service. Thus, one month after issue of the daily price value, a new daily price value must be obtained from the supplier. The frequency with a new daily price value must be obtained depends on a number of factors such as the product or service involved. In a preferred embodiment, the daily price value is obtained from the supplier upon end-user demand for price information. The daily price value is optionally obtained directly from the supplier or from an administrator-controlled database. In a preferred option, the daily price value is retrieved from a database controlled by an intermediary.

In a particular embodiment of an inventive method, an end-user requests price information for a hotel stay. Since the hotel industry is one in which room prices and availability frequently fluctuate, it is preferred that the daily price value is obtained in immediate response to the end-user request for information. A particular hotel, or central information contact for a hotel chain may be contacted, preferably by a communications network connection, such as an Internet connection, to obtain the daily price value. Alternatively, a daily price value is obtained through an intermediary, such as Pegasus Solutions, Inc., which maintains a switch for interfacing to a database of one of many hotels. In a further embodiment, a daily price value is obtained from a database containing daily rate values communicated to the intermediary or directly entered into a database maintained by the intermediary.

In a further step 206 of an inventive method, a base price value for the product or service of interest to the end-user is retrieved. For example, the base price value may be retrieved from a database maintained by an administrator or supplier. As described, the base price value is typically negotiated between the administrator and supplier, or alternatively, between the client and supplier.

Another step of an illustrated embodiment includes a step 208 of adjusting the base price value to determine the adjusted base price value, as described herein. The adjusted base price value is the price that the end-user pays using an actual currency, such as by credit card, debit card, or the like. In one embodiment, a client optionally pays the adjusted base price value for the end-user, such as when a client wishes to extend an extra reward to an end-user.

A further step 210 of a method according to an embodiment of the invention includes calculating a savings value associated with the product or service of interest to an end-user as described herein.

In a step 212 of a method according to an embodiment of the invention, price and savings values are presented to an end-user. In a preferred option, price information presented to the end-user includes presenting the daily price value, the adjusted base price value and the savings value associated with the product or service of interest. In a further preferred option, the daily price value, the adjusted base price value and the savings value are presented in tabular form. Optionally, other forms of presentation may be used, such as a list, a graph, or other form of presentation of the information described.

A further step 214 in an embodiment of an inventive method includes receiving an end-user request to purchase the product. The request may include end-user specification of an amount of virtual currency the end-user desires to apply to the savings value. In a preferred embodiment, the end-user does not have the option to specify an amount of virtual currency to apply other than the amount of the savings value displayed to the user. However, as described herein, in one embodiment, the end-user may optionally pay part of the savings value with actual currency where the end-user has insufficient virtual currency to pay the savings value with virtual currency. The request is preferably received via a communications network, such as by Internet communication, but may also be communicated by other means such as telephone, in person, regular mail and the like.

An additional step 216 includes determining whether the end-user has an amount of virtual currency in the end-user account at least equal to the amount of the savings value. This step is preferably performed by computer access of end-user account information.

Where the end-user has sufficient virtual currency, a further step 218 of the illustrated embodiment of an inventive method includes subtracting an amount of virtual currency equal to the presented savings value from the end-user's account.

In the case that the end-user does not have enough virtual currency in the end-user's account, an optional step 220 in the depicted embodiment of an inventive method includes notifying the end-user that the amount of the savings value is greater than the amount of virtual currency in the end-user account. An end-user may be informed about the amount of virtual currency in the end-user's account in various ways. For example, an error message may be displayed, a link to the end-user's account information may be activated and/or account information may be mailed, e-mailed or otherwise communicated to the end-user. In further options, an end-user may be informed about the amount of virtual currency in the end-user's account by visual cues such as color indicators included in product price information presentations and/or end-user account presentations. For example, a presented savings value may be colored green to indicate that the end-user has sufficient virtual currency to pay the savings value. However, one or more of the values may be colored red to indicate insufficient virtual currency. Other colors may be used to indicate this information. Other indicators may be used, such as an audible warning tone or message, a written message such as a pop-up dialog box, and the like.

An optional step 222 includes offering the end-user the option of paying a portion of the savings value in actual currency where the end-user has insufficient virtual currency.

Also included is a step 224 of receiving details from the end-user indicating payment of actual currency in an amount at least equal to the adjusted base price value.

A step 226 is optionally incorporated in an embodiment allowing the end-user to partially pay the savings value with actual currency. Optional step 226 includes receiving details from the end-user indicating payment of actual currency in an amount at least equal to the adjusted base price value and any amount of the savings value unmet by the end-user payment of virtual currency.

FIG. 11 illustrates an embodiment of an inventive method including a step 302 of maintaining a database, such as a step selected from: maintaining a database including end-user identifying information 304, maintaining a database including end-user account information, such as a balance of virtual currency 306, and maintaining a database including base price value associated with a product 308. Also shown are steps of receiving an end-user request for price information associated with a product or service 310, retrieving a daily price value associated with the product or service for which the end-user has requested information 312, retrieving a base price value for the product or service of interest to the end-user 314, and adjusting the base price value to determine the adjusted base price value 316, as described herein. Further shown is a step 318 including calculating a savings value associated with the product or service of interest to the end-user based on the daily price value and the adjusted base price value. In addition, a step 320 includes presenting the daily price value, the adjusted base price value and the savings value to the end-user in tabular form. Also depicted are steps 322, 324, 326, 328, 330, 332 and 334 described above in relation to steps 214, 216, 218, 220, 222, 224 and 226 respectively.

An example of a tabular presentation is shown in FIGS. 12 A and B. FIG. 12A illustrates product price information presentation 400 for a hypothetical product.

In one embodiment, a portion of the margin is allocated to an entity other than the end-user, such as the administrator. An entity may also be a charitable organization, political organization or cause, non-profit organization or any organization designated by a participant, including a client, supplier, administrator, intermediary or end-user. In such an embodiment, the product price information presented to the end-user may include an indication of the allocation to an entity. FIG. 12B illustrates a illustrative product price information display 500 presented to an end-user in an embodiment in which a charitable donation is made. It will be noted that the savings value is decreased by the amount of the charitable donation in this example. Optionally, the base price value or daily price value may be decreased by the amount of the allocation to an entity. In a further option, the amount of a donation may be hidden, or may be shown in other ways.

FIG. 13 illustrates a tabular presentation of price information 600 included in an embodiment of an inventive system and method. In this illustration, the product of interest is a hotel stay. The daily price value is shown in the row 640 titled 'hotel price.' The base price value or adjusted base price value is shown in the row 642 titled 'your hotel cost after rewards.' The savings/discount value is shown in row 644 titled 'virtual cash reward.' Optionally, the information is presented to show costs and savings over a period of time. FIG. 13 shows information associated with each day of a hotel stay in columns 646. In addition, total costs and savings are shown in a totals column 648. A totals column is optionally included to present information selected from the group consisting of: total daily price value, total base price value, total savings value, total virtual currency applied to the purchase, total virtual currency in an end-user account and combinations thereof. In a preferred embodiment, the information is presented to an end-user by way of a communications network connection, such as an Internet connection, for example, displayed on a web page.

FIG. 14 illustrates a tabular presentation 650 of information regarding an end-user's virtual currency account.

Figure 15:
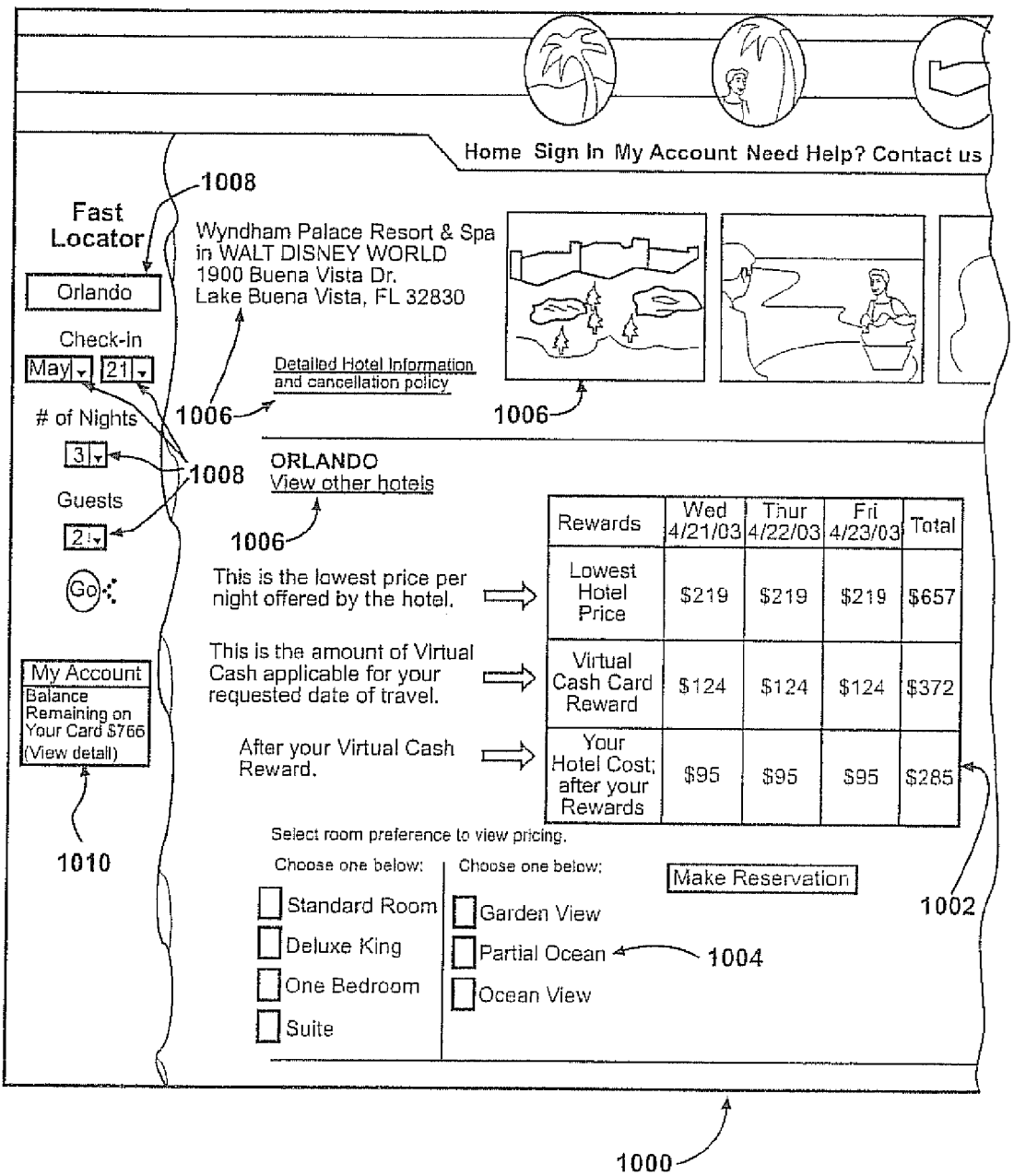
FIG. 15 is a drawing illustrating an end-user interface in the form of a web page.

FIG. 15 shows an illustrative end-user interface in the form of a web page at 1000 which includes a tabular presentation of product price information 1002 as well as links to various functionalities. As illustrated, a presentation of product information embedded in a web page may include other optional functionalities such as product options 1004, product information 1006, further product request options 1008, links to account information 1010, and the like. Product price information may also be presented in printed/mailed form. The presentation of the product price information including base price value, daily price value and savings value may be computer generated and communicated over a communications network, such as the internet, to an end-user such that the end-user may view the information on screen and/or print.

Since the daily price value may be subject to change, the administrator and/or supplier optionally define a time frame within which the product price information is valid and during which the end-user can purchase the product using the information presented. For example, an end-user may be limited to purchase of the product within several minutes to several weeks after receiving the price information.

In a one embodiment of an inventive method, an identifier is associated with an end-user transaction such as an end-user's request to purchase a product or service to facilitate reconciling various aspects of the transaction in an administrator's records. For example, when an end-user makes a purchase request, a credit card of the end-user is charged by the administrator for the amount to be paid in actual currency. The administrator communicates notification of the purchase to the product or service supplier and in one embodiment, further communicates administrator credit card information to the supplier authorizing the supplier to charge the amount of actual currency to the administrator credit card once the product or service is delivered to the end-user. Since the administrator is likely to be involved in numerous such transactions each day, the charges to the administrator credit card are preferably tagged with an identifier indicative of a particular end-user transaction so that once delivery of the product or service to the end-user is successfully accomplished, the administrator can so indicate in administrator records, finalizing the transaction. In one embodiment, an identifier is associated with an end-user transaction by use of a single use credit card with a unique identifier, such as a unique credit card number. In such an embodiment, a single use credit card number is communicated to the supplier and recorded in administrator files. Such a single use credit card number may be associated with limitations such as a charge amount limit or designation of a particular product or service which can be charged to the card number in order to provide security and avoid unauthorized transactions. Once the end-user has received the goods or services purchased, the supplier may send confirmation including the single use credit card number to the administrator such that the administrator is able to easily identify the transaction in administrator files.

A further step includes identifying the end-user (not shown). This step is optionally performed by end-user entry of identifying information such as end-user name, password, account number, e-mail address, or a combination of these. End-user identifying information may be verified by, for example, comparison with identifying information stored in a database as described herein. If the end-user cannot be verified as a known end-user, an error message or other notification may be returned to the end-user requesting re-entry of the information. Optionally, the unidentified end-user may be prompted to register their account, for instance by initial entry of information printed on a card distributed by a client, supplier or administrator. The step of identifying the end-user is optionally performed after the end-user has reviewed available products and services.

An optional step (not shown) includes providing the end-user with confirmation of product purchase. A further optional step (not shown) includes providing the end-user with details of shipping and the like.

In one embodiment of an inventive system and method, an end-user account is established which is associated with end-user information such as a name, end-user ID, or the like. An end-user account associated with end-user information such as a name, end-user ID, or the like may be established by an administrator in a preferred embodiment. In a further embodiment, a card, letter or other medium indicating an account number and pass code is distributed to an end-user. In such an embodiment, end-user identification information is not associated with the account number and pass code. Rather, the end-user having the card, letter or other medium indicating an account number and pass code enters the account number and pass code via an end-user interface to access the account. Preferably, once the account number and pass code are entered, the end-user is prompted to enter identifying information such as a name, address, client affiliation and the like such that the account and pass code are associated with the end-user.

In one embodiment of an inventive system and method, the product is hotel rooms and services. In additional embodiments, the product is travel related for example, air travel, cruise trips, travel related merchandise such as luggage, accessories, and the like. In further embodiments, the product is entertainment such as tickets, videos, DVDs, audio recordings, restaurant products; general or specialized merchandise such as clothing, appliances, electronic devices; and services such as lawn care, home improvement and repair services, personal care services, and pet care services.

Preferably, an inventive method is a communications network-based method. In a preferred embodiment, participants in an inventive system and method communicate by communications network such as an Internet connection. Internet connections include a direct internet connection, a dial-up internet connection, server access, a digital line, such as an ISDN, T1 or T3 digital connection, a local area network (LAN) connection, a wide area network (WAN), an Ethernet connection, a DSL connection or any other wired or wireless connection. Devices used in a communications network include any suitable communications devices such as a computer including a processor, a memory, an input component, an output component, a program stored in the memory and accessible by the processor for performing one or more steps of an inventive method as described herein, and a display device. Further included is a database as described herein for access in a step of an inventive method, such as a database maintained by a client, administrator, supplier and/or intermediary. Devices used in a communications network further include a telephone, including such telephone device as a cellular telephone, a wireless telephone, a mobile telephone, a display telephone, a paging system, a personal computer, a personal digital assistant, and a facsimile machine.

Optionally, an administrator provides a website customized for a client, supplier or end-user. The customized website optionally interacts with the administrator's own database or databases, and server to implement an inventive method. In a further option, the customized website interacts with a database owned and/or maintained by the customized website owner/licensee and may interact with a computer-executable program owned/maintained by the customized website owner.

In a further preferred embodiment, an inventive system and/or method may be customized such that information accessed or received by one end-user may differ from that accessed or received by another end-user. For example, an end-user may be presented with a wide range of products or services available for purchase. Alternatively, an end-user may be presented with a limited range of products or services, such as hotels only. In another embodiment, a first end-user and a second end-user may be presented with different sets of available products or services and, in addition, the prices of the available products and/or services presented to the first end-user and second end-user may differ. Such differences may be based on a hierarchical rewards scheme, or a marketing strategy, for example.

In one embodiment, a method according to the invention includes the step of presenting an end-user with price information in response to an end-user request, wherein the price information is stored in a stable conformation rather than being generated in response to the end-user request. That is, rather than requesting and receiving dynamic information from the supplier and calculating the savings at the time of the request, the savings value has been calculated and stored in a suitable presentation format, such as a table described above, for presentation in response to an end-user request.

In another embodiment, an end-user may be presented with product price information showing a base price value, a daily price value and a savings value without a direct end-user request. For example, the product price information may be presented in response to a client request, client initiative, a supplier request, supplier initiative, administrator request to a client or supplier or an administrator initiative. In an illustrative example, a supplier wishing to promote a product may request that an administrator send a presentation of product price information including a base price value, a daily price value and a savings value to an end-user, for instance by e-mail or mailed advertising.

Further provided is an embodiment of an inventive system and method in which the a portion of the margin ranging from 0.001 to 100% is allocated to the administrator and wherein the administrator further devotes a portion of the allocated amount to acquiring a reward item in order to present the end-user with a bonus in the form of the reward item. In a preferred embodiment, 100% of the margin is allocated to the administrator and the administrator further devotes a portion or the total of the allocated amount to acquiring a reward item in order to present the end-user with a bonus in the form of a reward item.

Illustrative examples of a reward item include "mileage points" or "loyalty points" such as are known in the art and which are redeemable for a product or service such as airline travel, hotel stays, meals, and the like. These may be purchased by the administrator for cash or obtained for other consideration.

In further embodiments of methods and systems of the present invention, methods and systems for providing a discount and/or a discount offer are provided which include a savings value indicative of an amount of a partner-issued currency or a combination of virtual currency and partner-issued currency to be paid by the end-user.

Thus, for example, in certain embodiments, a method for providing a discount and/or a discount offer includes calculating a difference between the retrieved daily price value and the adjusted base price value to determine a savings value of the product, the savings value indicative of an amount of a partner-issued currency or a combination of virtual currency and partner-issued currency to be paid by the end-user.

Figure 16:
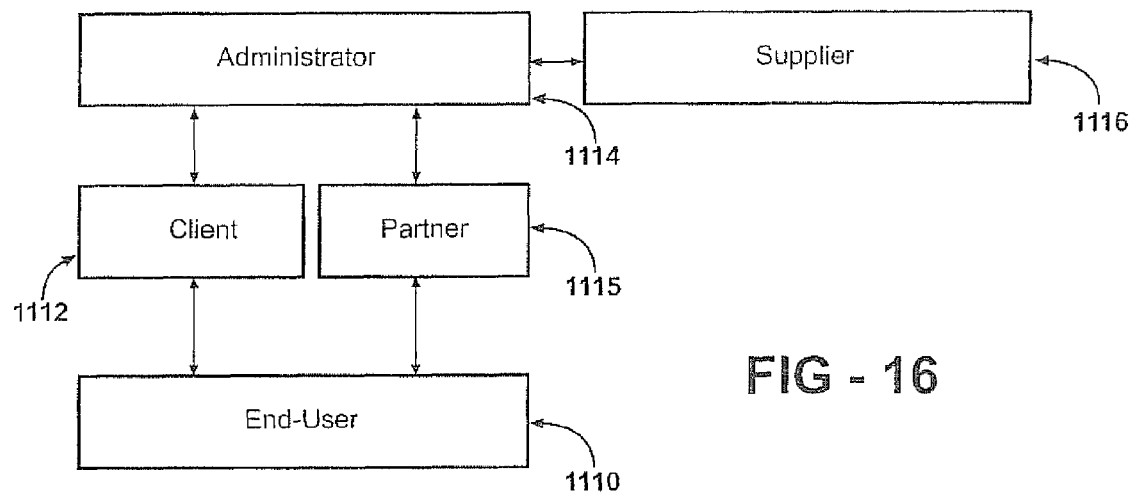
FIG. 16 is a drawing illustrating relationships between various participants in an embodiment of an inventive system.

As noted above, a partner-issued currency may be any type of non-actual currency, illustratively including "miles" issued by an airline company. FIG. 16 illustrates an embodiment in which a partner 1115 interacts with an end-user 1110 such that an end-user has access to a partner-issued currency, while an administrator 1114 interacts with a partner 1115 such that an end-user is authorized to obtain a discount or discount offer on products and services using a system and/or method according to the present invention. Optionally, a client 1112 may also interact with an end-user such that the end-user has access to a virtual currency.

Figure 17:
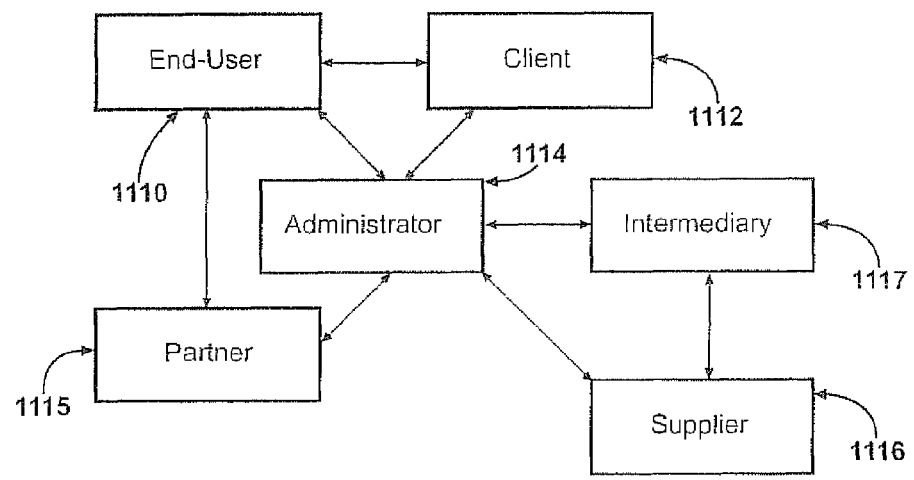
FIG. 17 is a drawing illustrating exemplary participant entities in an embodiment of an inventive system and method.

FIG. 17 illustrates an embodiment in which an end-user 1110 interacts with a partner 1115 and optionally with an administrator 1114 and/or client 1112.

An embodiment of a system according to the present invention in which a partner-issued currency may be used by the end-user to obtain a discount preferably includes components described herein, such as those illustrated schematically in FIG. 3, including data input and output capacity, processing circuitry, memory circuitry and an executable program for carrying out one or more steps in an inventive method.

Figure 18:
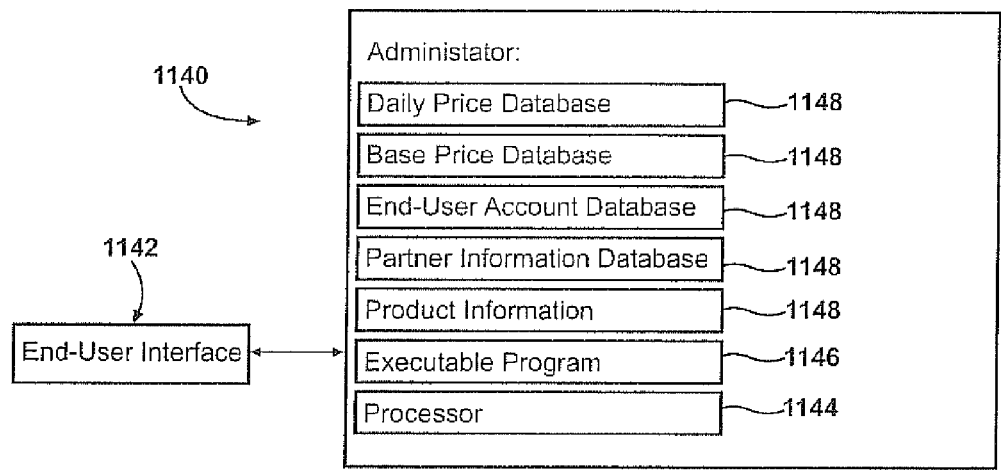
FIG. 18 is a drawing illustrating an embodiment of an inventive system in which an end-user interface is provided along with processing circuitry and an executable program for carrying out one or more steps in an inventive method.

FIG. 18 illustrates an embodiment of an inventive system, 1140, in which an end-user interface 1142 is provided along with processing circuitry 1144, and an executable program 1146 for carrying out one or more steps in an inventive method. Also included is memory circuitry 1148 including a daily price database, a base price database, an end-user account database, a partner information database, and a product information database. A client database may also be included in certain embodiments. In an illustrative embodiment, database components are administrator controlled, such that an active connection to a client, supplier, or intermediary database is unnecessary to carry out a step of an inventive method. For example, in such an embodiment, a daily price value is stored in a database controlled by an administrator such that a real-time inquiry to another entity for a daily price value is unnecessary to calculate a savings value, present price information to an end-user and complete a transaction in which an end-user receives a discount on a product or service.

Figure 19:
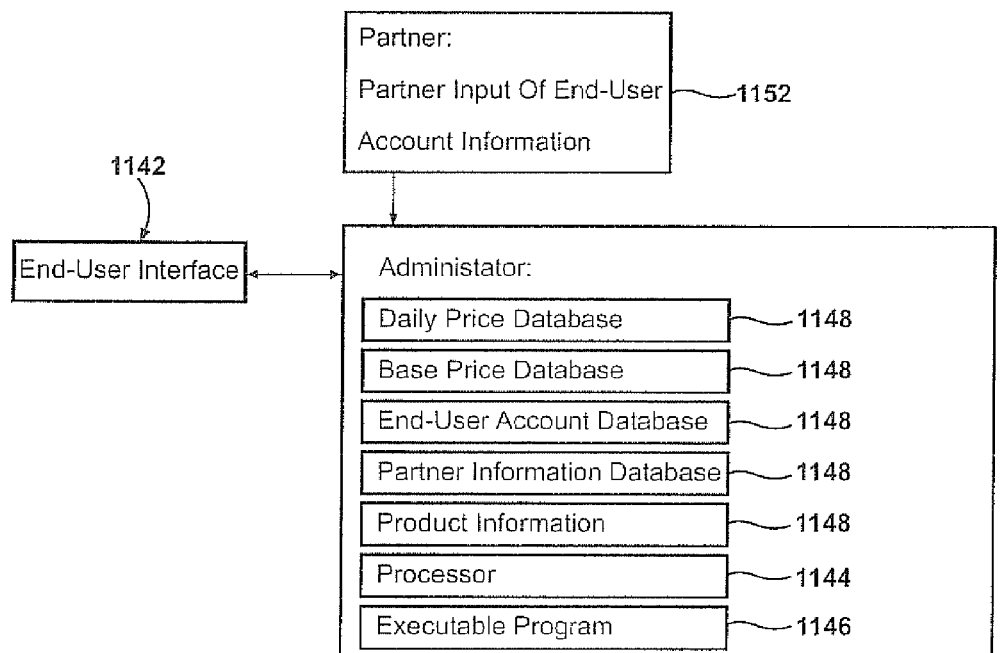
FIG. 19 is a drawing illustrating an embodiment of an inventive system in which an end-user interface is provided along with processing circuitry and an executable program for carrying out one or more steps in an inventive method.

FIG. 19 illustrates an embodiment of an inventive system, 1150, in which an end-user interface 1142 is provided along with processing circuitry 1144, and an executable program 1146 for carrying out one or more steps in an inventive method. Also included is memory circuitry 1148 including a daily price database, a base price database, an end-user account database, a partner information database, and a product information database. A client database may also be included in certain embodiments. In an illustrative embodiment, some database components are administrator controlled. In addition, a client interface 1152 is provided in an illustrated embodiment, allowing for client input of end-user account information, such as a list of end-users and amounts of a virtual currency to be added to end-user accounts. Such information may be input to directly update an end-user account. Alternatively, such information may be transmitted to an administrator, such as by e-mail or FTP download of information for instance, for administrator entry.

Figure 20:
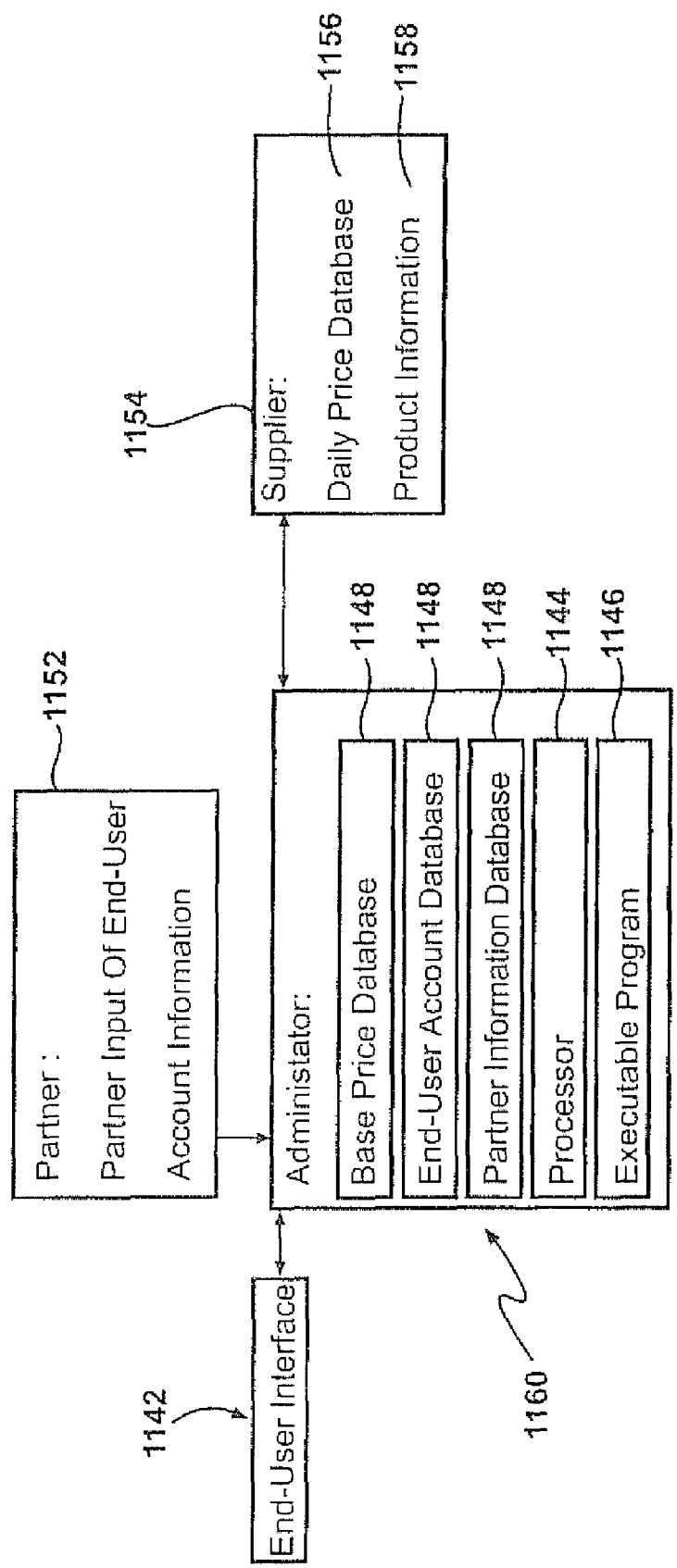
FIG. 20 is a drawing illustrating an embodiment of an inventive system in which an end-user interface is provided along with processing circuitry and an executable program for carrying out one or more steps in an inventive method.

FIG. 20 illustrates an embodiment of an inventive system, 1160, in which an end-user interface 1142 is provided along with processing circuitry 1144, and an executable program 1146 for carrying out one or more steps in an inventive method. Also included is memory circuitry 1148 including a base price database, an end-user account database, and a partner information database. A client database may also be included in certain embodiments. In an illustrative embodiment, some database components are administrator controlled. In addition, an optional client interface 1152 is illustrated. Further depicted are supplier components 1154. In a particular embodiment, a supplier controls a daily price value database 1156 which may be accessed by an administrator to retrieve a daily price value. In addition, a supplier may optionally provide product information 1158. For example, a supplier may present product information on a web page controlled by the supplier and the administrator may provide a link to the information to an end-user. Such product information illustratively includes such information as a description of the product, a technical specification of the product, an illustration of the product, a location of the product, a map showing the location of the product, a critical review of the product, instructions on use of the product, combinations thereof, and the like.

Figure 21:
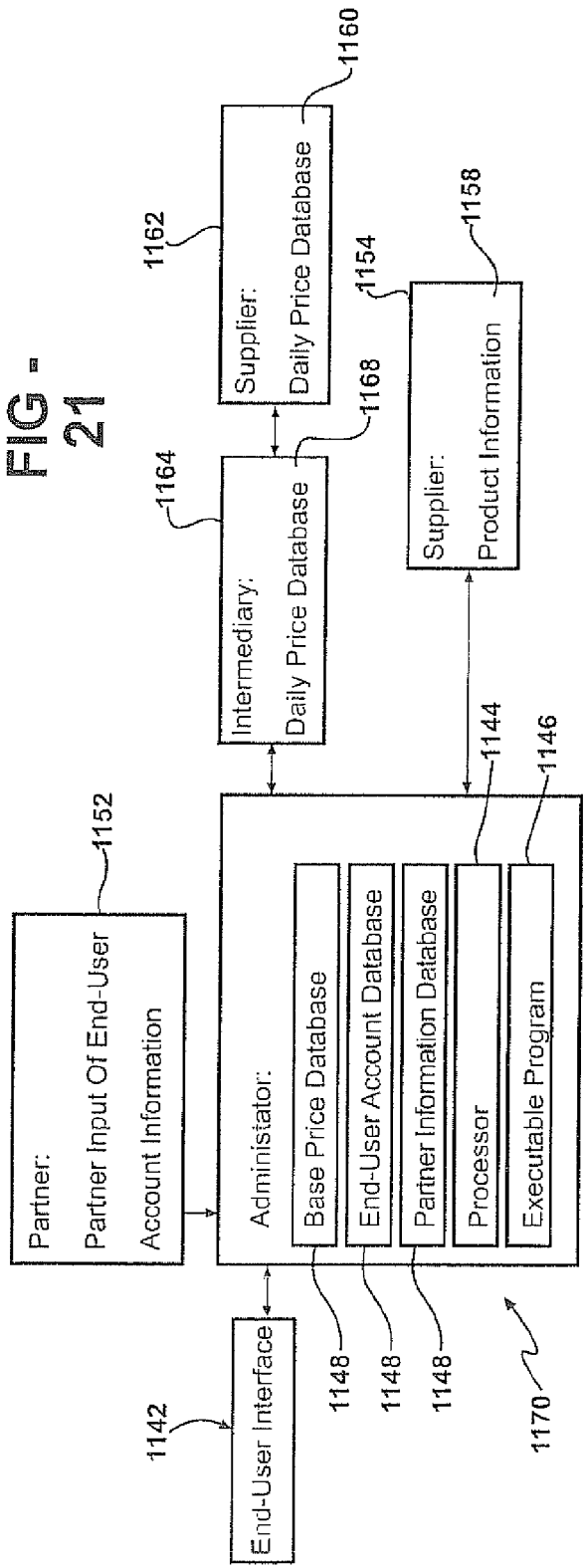
FIG. 21 is a drawing illustrating an embodiment of an inventive system in which an end-user interface is provided along with processing circuitry and an executable program for carrying out one or more steps in an inventive method.

FIG. 21 illustrates an embodiment of an inventive system, 1170, in which an end-user interface 1142 is provided along with processing circuitry 1144, and an executable program 1146 for carrying out one or more steps in an inventive method. Also included is memory circuitry 1148 including a base price database, an end-user account database, and a partner information database. A client database may also be included in certain embodiments. In an illustrative embodiment, some database components are administrator controlled. An optional client interface 1152 is also shown. Further, a supplier provided component 1154 is illustrated and may include product information 1158. For example, a supplier may present product information on a web page controlled by the supplier and the administrator may provide a link to the information to an end-user. In a particular embodiment, a supplier provided component 1162 is communicated to an intermediary 1164 which provides access to an administrator. In particular, a supplier provided component 1162 communicated to an intermediary 1164 includes a supplier database 1160 containing daily price value information.

Figure 22:
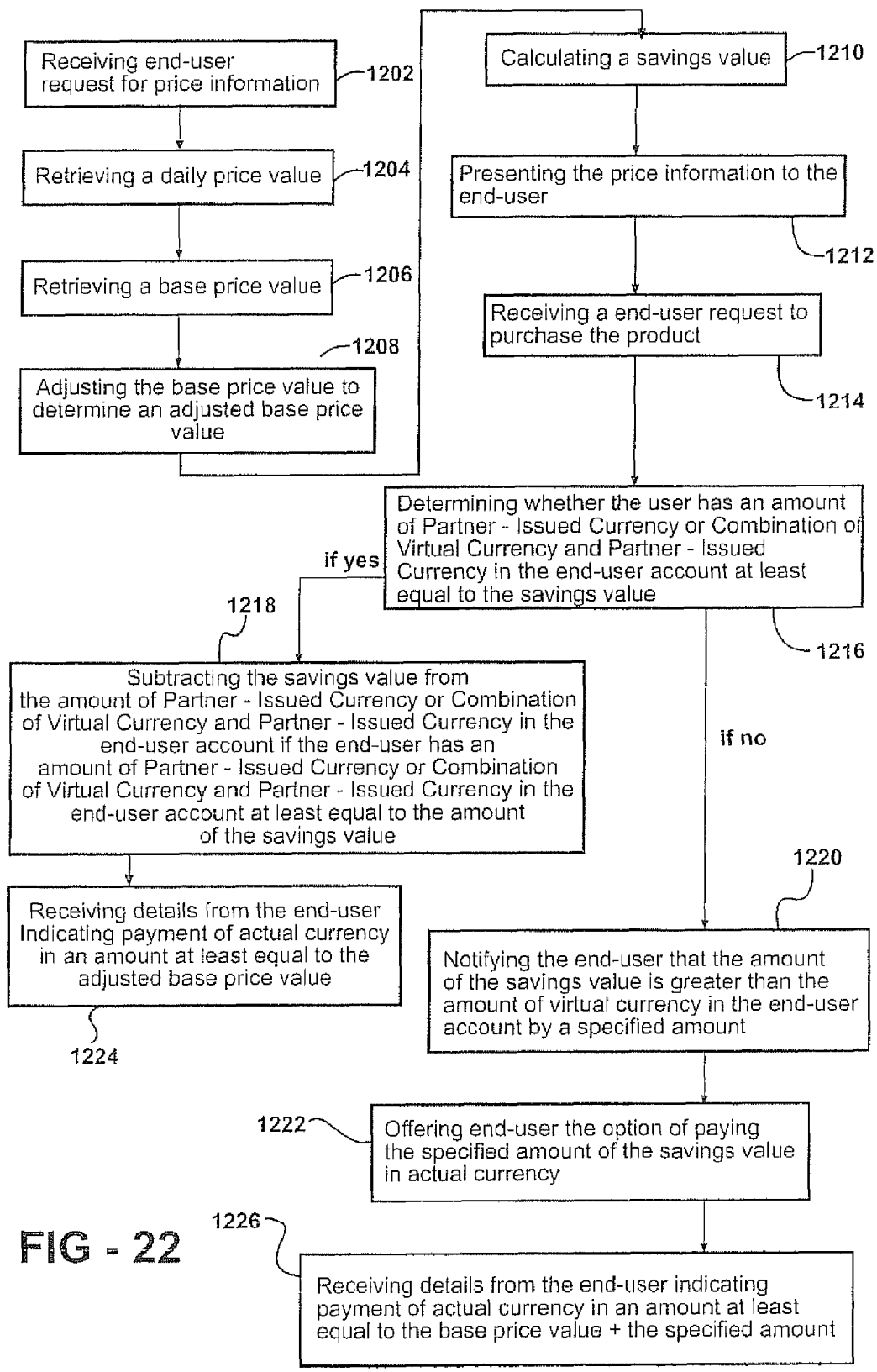
FIG. 22 is a block diagram illustrating an embodiment of an inventive method.

Further provided by the present invention is an embodiment of an inventive method including steps depicted in FIG. 22. An illustrated embodiment of an inventive method includes the step 1202 of receiving an end-user request for price information associated with a product or service. In a preferred embodiment, the end-user request is received over a communications network, such as a wireless or wired LAN, WAN, or other network, including, the "internet." For example, the end-user preferably uses a computer or other electronic device capable of receiving Internet communications to access a web page displaying information indicating participation in an inventive method. The web page optionally displays administrator information such as name and/or logo. In a further option, the website displays client information such that the end-user associates the savings value with the identity of the client. Alternatively, the end-user may request the price information by telephone or in person from a representative.

A further step 1204 includes retrieving a daily price value associated with the product or service for which the end-user has requested information. Since the daily price value may vary considerably with time, the daily price value may be established by the supplier as valid for a particular period of time. For instance, the supplier may stipulate that a given daily price value is good for one month after issue for a particular product or service. Thus, one month after issue of the daily price value, a new daily price value must be obtained from the supplier. The frequency with a new daily price value must be obtained depends on a number of factors such as the product or service involved. In a preferred embodiment, the daily price value is obtained from the supplier upon end-user demand for price information. The daily price value is optionally obtained directly from the supplier or from an administrator-controlled database. In a preferred option, the daily price value is retrieved from a database controlled by an intermediary.

In a particular embodiment of an inventive method, an end-user requests price information for a hotel stay. Since the hotel industry is one in which room prices and availability frequently fluctuate, it is preferred that the daily price value is obtained in immediate response to the end-user request for information. A particular hotel, or central information contact for a hotel chain may be contacted, preferably by a communications network connection, such as an Internet connection, to obtain the daily price value. Alternatively, a daily price value is obtained through an intermediary, such as Pegasus Solutions, Inc., which maintains a switch for interfacing to a database of one of many hotels. In a further embodiment, a daily price value is obtained from a database containing daily rate values communicated to the intermediary or directly entered into a database maintained by the intermediary.

In a further step 1206 of an inventive method, a base price value for the product or service of interest to the end-user is retrieved. For example, the base price value may be retrieved from a database maintained by an administrator or supplier. As described, the base price value is typically negotiated between the administrator and supplier, or alternatively, between the client and supplier.

Another step of an illustrated embodiment includes a step 1208 of adjusting the base price value to determine the adjusted base price value, as described herein. The adjusted base price value is the price that the end-user pays using an actual currency, such as by credit card, debit card, or the like. In one embodiment, a client optionally pays the adjusted base price value for the end-user, such as when a client wishes to extend an extra reward to an end-user.

A further step 1210 of a method according to an embodiment of the invention includes calculating a savings value associated with the product or service of interest to an end-user as described herein. An exemplary calculating step includes calculating a difference between the retrieved daily price value and the adjusted base price value to determine a savings value of the product, the savings value indicative of an amount of a partner-issued currency or a combination of virtual currency and partner-issued currency to be paid by the end-user.

In a step 1212 of a method according to an embodiment of the invention, price and savings values are presented to an end-user. In a preferred option, price information presented to the end-user includes presenting the daily price value, the adjusted base price value and the savings value associated with the product or service of interest. In a further preferred option, the daily price value, the adjusted base price value and the savings value are presented in tabular form. Optionally, other forms of presentation may be used, such as a list, a graph, or other form of presentation of the information described.

A further step 1214 in an embodiment of an inventive method includes receiving an end-user request to purchase the product. The request may include end-user specification of an amount of partner-issued currency or a combination of virtual currency and partner-issued currency the end-user desires to apply to the savings value. In a preferred embodiment, the end-user does not have the option to specify an amount of partner-issued currency or a combination of virtual currency and partner-issued currency to apply other than the amount of the savings value displayed to the user. However, as described herein, in one embodiment, the end-user may optionally pay part of the savings value with actual currency where the end-user has insufficient virtual currency to pay the savings value with partner-issued currency or a combination of virtual currency and partner-issued currency. The request is preferably received via a communications network, such as by Internet communication, but may also be communicated by other means such as telephone, in person, regular mail and the like.

An additional step 1216 includes determining whether the end-user has an amount of partner-issued currency or combination of virtual currency and partner-issued currency in the end-user account at least equal to the amount of the savings value. This step is preferably performed by computer access of end-user account information.

Where the end-user has sufficient partner-issued currency or combination of virtual currency and partner-issued currency, a further step 1218 of the illustrated embodiment of an inventive method includes subtracting an amount of partner-issued currency or combination of virtual currency and partner-issued currency equal to the presented savings value from the end-user's account.

In the case that the end-user does not have enough partner-issued currency or a combination of virtual currency and partner-issued currency in the end-user's account or accounts, an optional step 1220 in the depicted embodiment of an inventive method includes notifying the end-user that the amount of the savings value is greater than the amount of partner-issued currency or combination of virtual currency and partner-issued currency in the end-user account. An end-user may be informed about the amount of partner-issued currency and/or virtual currency in the end-user's account in various ways. For example, an error message may be displayed, a link to the end-user's account information may be activated and/or account information may be mailed, e-mailed or otherwise communicated to the end-user. In further options, an end-user may be informed about the amount of partner-issued currency and/or virtual currency in the end-user's account by visual cues such as color indicators included in product price information presentations and/or end-user account presentations. For example, a presented savings value may be colored green to indicate that the end-user has sufficient partner-issued currency and/or virtual currency to pay the savings value. However, one or more of the values may be colored red to indicate insufficient partner-issued currency and/or virtual currency. Other colors may be used to indicate this information. Other indicators may be used, such as an audible warning tone or message, a written message such as a pop-up dialog box, and the like.

An optional step 1222 includes offering the end-user the option of paying a portion of the savings value in actual currency where the end-user has insufficient partner-issued currency and/or virtual currency.

Also included is a step 1224 of receiving details from the end-user indicating payment of actual currency in an amount at least equal to the adjusted base price value.

A step 1226 is optionally incorporated in an embodiment allowing the end-user to partially pay the savings value with actual currency. Optional step 1226 includes receiving details from the end-user indicating payment of actual currency in an amount at least equal to the adjusted base price value and any amount of the savings value unmet by the end-user payment of partner-issued currency and/or virtual currency.

Figure 23:
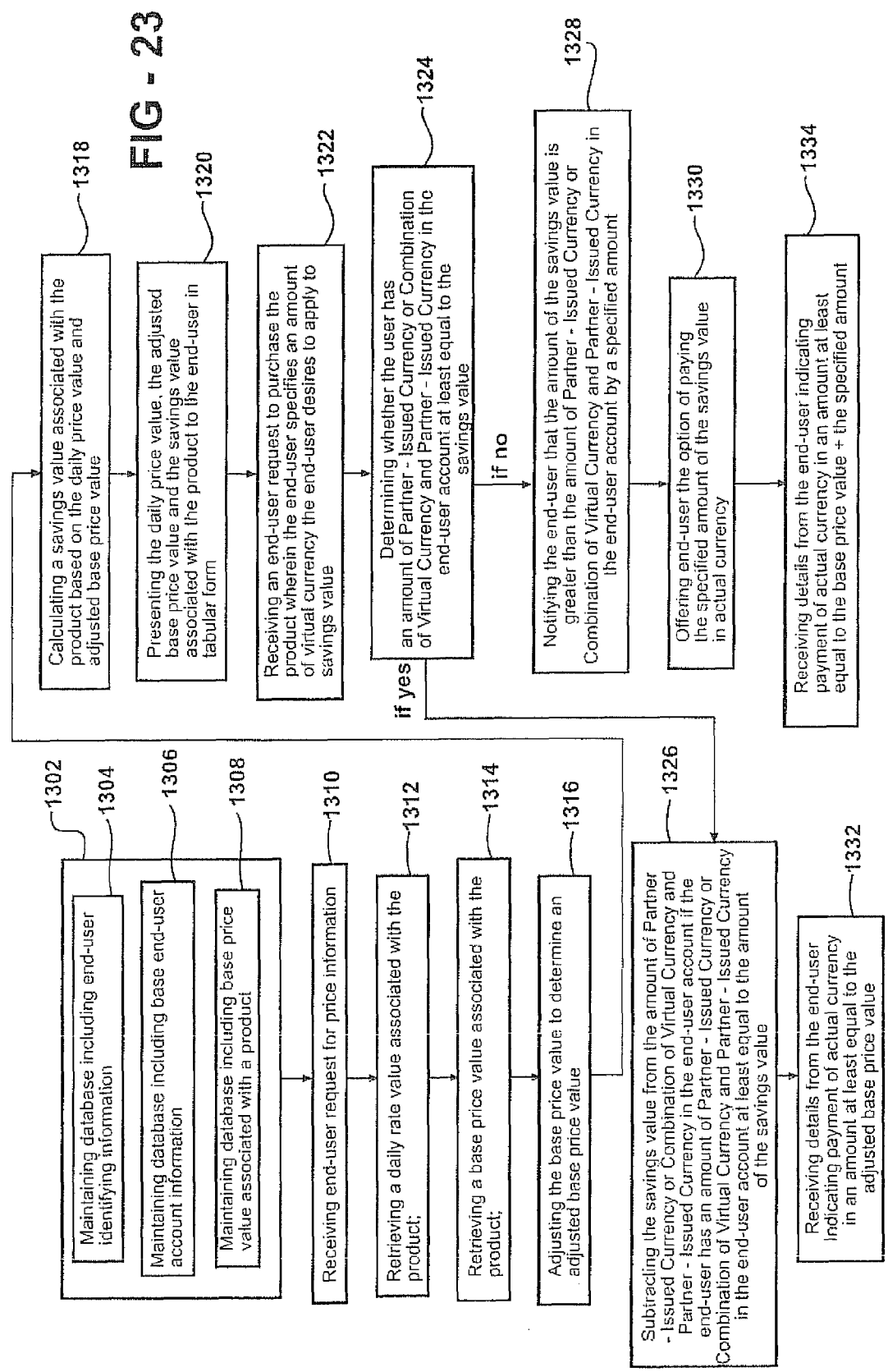
FIG. 23 is a block diagram illustrating an embodiment of an inventive method.

FIG. 23 illustrates an embodiment of an inventive method including a step 1302 of maintaining a database, such as a step selected from: maintaining a database including end-user identifying information 1304, maintaining a database including end-user account information, such as a balance of virtual currency and/or a balance of a partner-issued currency 1306, and maintaining a database including base price value associated with a product 1308. Also shown are steps of receiving an end-user request for price information associated with a product or service 1310, retrieving a daily price value associated with the product or service for which the end-user has requested information 1312, retrieving a base price value for the product or service of interest to the end-user 1314, and adjusting the base price value to determine the adjusted base price value 1316, as described herein. Further shown is a step 1318 including calculating a savings value associated with the product or service of interest to the end-user based on the daily price value and the adjusted base price value. In addition, a step 1320 includes presenting the daily price value, the adjusted base price value and the savings value to the end-user in tabular form. Also depicted are steps 1322, 1324, 1326, 1328, 1330, 1332 and 1334 described above in relation to steps 1214, 1216, 1218, 1220, 1222, 1224 and 1226 respectively.

FIG. 24 illustrates a tabular presentation of price information 1400 included in an embodiment of an inventive system and method. In this illustration, the product of interest is a hotel stay. The daily price value is shown in the row 1440 titled 'Hotel Price.' The base price value or adjusted base price value is shown in the row 1442 titled 'Your Hotel Cost after Partner-Issued Currency Contribution.' The savings/discount value is shown in row 1444 titled 'Partner-Issued Currency Contribution.' Optionally, the information is presented to show costs and savings over a period of time. In addition, where a virtual currency is used in combination with a partner-issued currency, that information may be included in the tabular presentation such as shown. FIG. 24 shows information associated with each day of a hotel stay in columns 1446. In addition, total costs and savings are shown in a totals column 1448. A totals column is optionally included to present information selected from the group consisting of: total daily price value, total base price value, total savings value, total partner-issued currency applied to the purchase, total virtual currency applied to the purchase, total partner-issued currency in an end-user account, total virtual currency in an end-user account, and combinations thereof. In a preferred embodiment, the information is presented to an end-user by way of a communications network connection, such as an Internet connection, for example, displayed on a web page.

FIG. 25 illustrates a tabular presentation 1550 of information regarding an end-user's partner-issued currency account and/or an end-user's virtual currency account.

FIG. 26 shows an illustrative end-user interface in the form of a web page at 1600 which includes a tabular presentation of product price information 1602 as well as links to various functionalities. As illustrated, a presentation of product information embedded in a web page may include other optional functionalities such as product options 1604, product information 1606, further product request options 1608, links to account information 1610, and the like. Product price information may also be presented in printed/mailed form. The presentation of the product price information including base price value, daily price value and savings value may be computer generated and communicated over a communications network, such as the internet, to an end-user such that the end-user may view the information on screen and/or print.

In one embodiment of an inventive system and method for providing a discount or a discount offer to an end-user, an amount of a virtual currency is distributed to an end-user in the form of a "gift card." In such an embodiment, an exhaustible, fixed amount of virtual currency is attributed to an individual holding a card. In a further embodiment, a gift card is refillable. For example, a client, administrator or partner may elect to give an end-user a gift card having a specified exhaustible amount of virtual currency. Once exhausted, the gift card optionally has virtual currency refilled in the original amount, or another amount, by the client, administrator or partner. In a further option, the end-user may pay actual currency to refill the gift card with virtual currency. The virtual currency may also be periodically refilled or supplemented, such as to reward the end-user for a particular activity or for continued participation in a program.

Figure 27:
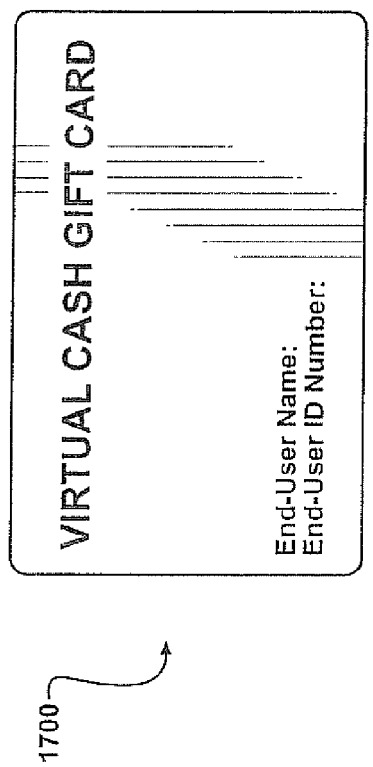
FIG. 27 is a drawing illustrating an end-user gift card optionally included in an inventive system or method.

An account is generally established in order to use the gift card. For instance, an end-user enters a code number printed or affixed to the gift card along with identifying information, such as credit card info/illation in order to establish an account. The end-user may access product information and inquire about pricing of the selected product or products. In a preferred option, a gift card confers access to a limited range of products or services. For instance, a gift card is configured as a "hotel gift card" in one embodiment, providing an end-user with a discount on a hotel stay. In such an embodiment, a user interface may be configured to display only hotel information to the end-user. For instance, the code number input by the end-user may encode information signifying "hotel gift card" such that only hotel information is included in a product information display presented to the end-user. Further, product or service information presented to the user may only include those products or services that have a margin value equal to or less than the "value" of the virtual currency displayed on the gift card. For example, where the "value" of the virtual currency displayed on the gift card is $50 of a virtual currency, the margin value of a hotel stay is preferably $50 or more of actual currency. FIG. 27 illustrates an end-user gift card optionally included in an inventive system or method.

Any patents or publications mentioned in this specification are herein incorporated by reference to the same extent as if each individual publication was specifically and individually indicated to be incorporated by reference. In particular, U.S. patent application Ser. Nos. 12/044,535, filed Mar. 7, 2008; 11/049,608, filed Feb. 2, 2005, now U.S. Pat. No. 7,925,533; and U.S. Provisional Patent Application Ser. Nos. 60/541,220, filed Feb. 2, 2004 and 60/894,059, filed Mar. 9, 2007, each of which is incorporated herein by reference in its entirety for all purposes.

One skilled in the art will readily appreciate that the present invention is well adapted to carry out the objects and obtain the ends and advantages mentioned, as well as those inherent therein. The apparatus and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. A method for booking a discounted hotel stay by an end-user, using virtual and actual currency, the method comprising the steps of:
   authorizing a client of an administrator to distribute a virtual currency to the end-user, the virtual currency authorized for distribution to the end-user by the administrator, wherein the administrator is the creator of the virtual currency and wherein the virtual currency has no per unit cost to the client;
   distributing the virtual currency, the virtual currency distributed by the client to the end-user without any limitation imposed by the administrator on the amount of the virtual currency distributed, wherein the end-user does not pay for the virtual currency;
   receiving an end-user request for price information for a hotel room;
   retrieving a daily price value of the hotel stay from a first database in response to the end-user request for price information, the first database being maintained by an intermediary or a supplier, the daily price value being a non-discounted price available to a consumer and being less than a rack rate for the hotel stay;
   retrieving a base price value of the hotel stay;
   calculating in response to the end-user request, by a computer system, a difference between the retrieved daily price value and the retrieved base price value to determine a margin value;
   allocating, by the computer system, a portion of the margin value to an entity other than the end-user;
   increasing, by the computer system, the base price value by an amount equal to the amount allocated to the entity to determine an adjusted base price value of the hotel stay, the adjusted base price value indicative of an amount of actual currency to be paid by the end-user;
   calculating a difference between the retrieved daily price value and the adjusted base price value to determine a savings value of the hotel stay, the savings value indicative of an amount of the virtual currency to be paid by the end-user;
   presenting the retrieved daily price value of the hotel stay, the adjusted base price value of the hotel stay and the savings value of the hotel stay to the end-user;
   receiving an end-user request to book the hotel stay;
   determining, by the computer system, that the end-user has an amount of available virtual currency at least equal to the amount of the savings value;
   subtracting, by the computer system, an amount of the virtual currency equal to the presented savings value from the available virtual currency; and
   receiving details from the end-user indicating payment of actual currency in an amount at least equal to the adjusted base price value, thereby providing the discounted hotel stay to the end-user.

2. The method of claim 1, wherein:
the base price value is retrieved from a second database in response to the end-user request.

3. The method of claim 2, wherein:
the second database is selected from the group consisting of: a supplier database, an intermediary database and an administrator database.

4. The method of claim 1, wherein:
the daily price value is valid for a defined time frame; and the method further comprising defining the time frame.

5. The method of claim 4, wherein:
a supplier of the hotel stay defines the time frame.

6. The method of claim 1, further comprising:
presenting information to the end-user to show costs and savings over a period of time.

7. The method of claim 1, wherein:
the end-user request is received over a communications network.

8. The method of claim 1, wherein:
the step of presenting the retrieved daily price value of the hotel stay, the adjusted base price value of the hotel stay and the savings value of the hotel stay to the end-user includes presentation of the retrieved daily price value of the hotel stay, the adjusted base price value of the hotel stay and the savings value of the hotel stay in tabular form.

9. The method of claim 1, wherein:
the virtual currency is denominated in terms associated with real currency.

10. A method for providing a discount offer for a hotel stay by an end-user, the method comprising the steps of:
   authorizing a client of an administrator to distribute a virtual currency to the end-user, the virtual currency authorized for distribution to the end-user by the administrator, wherein the administrator is the creator of the virtual currency and wherein the virtual currency has no per unit cost to the client;
   distributing the virtual currency, the virtual currency distributed by the client to the end-user without any limitation imposed by the administrator on the amount of the virtual currency distributed, wherein the end-user does not pay for the virtual currency;
   receiving an end-user request for price information for a hotel room;
   retrieving a daily price value of the hotel stay from a first database in response to the end-user request for price information, the first database being maintained by an intermediary or a supplier, the daily price value being a non-discounted price available to a consumer and being less than a rack rate for the hotel stay;
   retrieving a base price value of the hotel stay;
   calculating in response to the end-user request, by a computer system, a difference between the retrieved daily price value and the retrieved base price value to determine a margin value;
   allocating, by the computer system, a portion of the margin value to an entity other than the end-user;

increasing, by the computer system, the base price value by an amount equal to the amount allocated to the entity to determine an adjusted base price value of the hotel stay, the adjusted base price value indicative of an amount of actual currency to be paid by the end-user;

calculating a difference between the retrieved daily price value and the adjusted base price value to determine a savings value of the hotel stay, the savings value indicative of an amount of the virtual currency to be paid by the end-user; and presenting the retrieved daily price value of the hotel stay, the adjusted base price value of the hotel stay and the savings value of the hotel stay to the end-user, thereby providing the discount offer to the end-user.

11. A computer system for providing a discounted hotel booking to an end-user, using virtual and actual currency comprising:

a device having a data input and output element, processing circuitry, memory circuitry and an executable program for performing a method comprising the steps of:

authorizing a client of an administrator to distribute a virtual currency to the end-user, the virtual currency authorized for distribution to the end-user by the administrator, wherein the administrator is the creator of the virtual currency and wherein the virtual currency has no per unit cost to the client;

distributing the virtual currency, the virtual currency distributed by the client to the end-user without any limitation imposed by the administrator on the amount of the virtual currency distributed, wherein the end-user does not pay for the virtual currency;

receiving an end-user request for price information for a hotel stay;

retrieving a daily price value of the hotel stay from a first database in response to the end-user request for price information, the first database being maintained by an intermediary or a supplier, the daily price value being a non-discounted price available to a consumer and being less than a rack rate for the hotel stay;

retrieving a base price value of the hotel stay;

calculating, by the computer system, a difference between the retrieved daily price value and the retrieved base price value to determine a margin value;

allocating, by the computer system, a portion of the margin value to an entity other than the end-user;

increasing, by the computer system, the base price value by an amount equal to the amount allocated to the entity to determine an adjusted base price value of the hotel stay, the adjusted base price value indicative of an amount of actual currency to be paid by the end-user;

calculating a difference between the retrieved daily price value and the adjusted base price value to determine a savings value of the hotel stay, the savings value indicative of an amount of the virtual currency to be paid by the end-user;

presenting the retrieved daily price value of the hotel stay, the adjusted base price value of the hotel stay and the savings value of the hotel stay to the end-user;

receiving an end-user request to purchase the hotel stay;

determining, by the computer system, that the end-user has an amount of available virtual currency at least equal to the amount of the savings value;

subtracting, by the computer system, an amount of the virtual currency equal to the presented savings value from the available virtual currency; and receiving details from the end-user indicating payment of actual currency in an amount at least equal to the adjusted base price value, thereby providing a discounted hotel stay to the end-user.

12. A method for booking a discounted hotel stay by an end-user, using virtual and actual currency, comprising:

distribution of a virtual currency by an administrator to the end-user, wherein the administrator is the creator of the virtual currency, wherein the virtual currency has no per unit cost to the end-user and wherein the end-user does not pay for the virtual currency;

receiving an end-user request for price information associated with a hotel stay or service;

retrieving a daily price value of the hotel stay from a first database in response to the end-user request for price information, the first database being maintained by an intermediary or a supplier, the daily price value being a non-discounted price available to a consumer and being less than a rack rate;

retrieving a base price value of the hotel stay;

calculating, by a computer system, a difference between the retrieved daily price value and the retrieved base price value to determine a margin value;

allocating, by the computer system, a portion of the margin value to an entity other than the end-user;

increasing, by the computer system, the base price value by an amount equal to the amount allocated to the entity to determine an adjusted base price value of the hotel stay, the adjusted base price value indicative of an amount of actual currency to be paid by the end-user;

calculating a difference between the retrieved daily price value and the adjusted base price value to determine a savings value of the hotel stay, the savings value indicative of an amount of the virtual currency to be paid by the end-user;

presenting the retrieved daily price value of the hotel stay, the adjusted base price value of the hotel stay and the savings value of the hotel stay to the end-user;

receiving an end-user request to book the hotel stay;

determining, by the computer system, that the end-user has an amount of available virtual currency at least equal to the amount of the savings value;

subtracting, by the computer system, an amount of the virtual currency equal to the savings value from the available virtual currency; and receiving details from the end-user indicating payment of actual currency in an amount at least equal to the adjusted base price value; thereby providing the discount to the end-user.

13. The method of claim 12, wherein:
the daily price value is valid for a defined time frame; and
the method further comprising defining the time frame.

14. The method of claim 13, wherein:
a supplier of the hotel stay defines the time frame.

* * * * *

UNITED STATES PATENT AND TRADEMARK OFFICE
CERTIFICATE OF CORRECTION

PATENT NO. : 8,234,163 B2
APPLICATION NO. : 13/188517
DATED : July 31, 2012
INVENTOR(S) : David Shaw et al.

It is certified that error appears in the above-identified patent and that said Letters Patent is hereby corrected as shown below:

Column 10, line 65, Delete "(Z×Y) an amount", Insert -- (Z×Y) = an amount --

Column 22, line 50, Delete "Card info/illation", Insert -- card information --

Signed and Sealed this
Twelfth Day of March, 2013

Teresa Stanek Rea
*Acting Director of the United States Patent and Trademark Office*